US012682478B1

(12) United States Patent
Tate et al.

(10) Patent No.: US 12,682,478 B1
(45) Date of Patent: Jul. 14, 2026

(54) SYSTEMS AND METHODS FOR CONFIRMING DIMENSIONS OF A MARINE VESSEL USING A VISION SYSTEM ON THE MARINE VESSEL

(71) Applicant: Brunswick Corporation, Mettawa, IL (US)

(72) Inventors: Brandon L. Tate, Walnut Hill, IL (US); Trevor George, Savoy, IL (US)

(73) Assignee: Brunswick Corporation, Mettawa, IL (US)

( * ) Notice: Subject to any disclaimer, the term of this patent is extended or adjusted under 35 U.S.C. 154(b) by 246 days.

(21) Appl. No.: 18/481,795

(22) Filed: Oct. 5, 2023

(51) Int. Cl.
*H04N 17/00* (2006.01)
*G06T 7/62* (2017.01)

(52) U.S. Cl.
CPC ............. *G06T 7/62* (2017.01); *H04N 17/002* (2013.01); *G06T 2207/30252* (2013.01)

(58) Field of Classification Search
CPC ............... G06T 7/62; G06T 2207/3025; G06T 2207/30252; H04N 17/002
See application file for complete search history.

(56) References Cited

U.S. PATENT DOCUMENTS

| | | | |
|---|---|---|---|
| 6,273,771 B1 | 8/2001 | Buckley et al. | |
| 9,927,520 B1 | 3/2018 | Ward et al. | |
| 10,259,555 B2 | 4/2019 | Ward et al. | |
| 10,429,845 B2 | 10/2019 | Arbuckle et al. | |
| 11,243,539 B2 | 2/2022 | Kurokawa et al. | |
| 11,403,955 B2 | 8/2022 | Derginer et al. | |
| 11,436,927 B2 | 9/2022 | Derginer et al. | |
| 2017/0299372 A1* | 10/2017 | Guerrini | G01S 7/411 |
| 2019/0392602 A1* | 12/2019 | Lloyd | G06T 7/73 |
| 2020/0051262 A1* | 2/2020 | McCloskey | G06T 7/20 |
| 2020/0402259 A1* | 12/2020 | Liu | H04N 7/18 |
| 2021/0178593 A1* | 6/2021 | Ye | B25J 9/1612 |
| 2024/0255934 A1* | 8/2024 | Thulasidoss | G05B 19/41885 |
| 2025/0121774 A1* | 4/2025 | Han | B60R 1/27 |

* cited by examiner

*Primary Examiner* — John W Miller
*Assistant Examiner* — Humam M Satti
(74) *Attorney, Agent, or Firm* — Andrus Intellectual Property Law, LLP

(57) ABSTRACT

A system for confirming dimensions of a marine vessel using a vision system on the marine vessel, is provided, comprising: cameras configured to mount to the vessel and associated with three-dimensional (3D) camera coordinate systems; a processor configured to: receive 3D location information of first points and second points on the marine vessel in a 3D global coordinate system based on transforms between first and second camera coordinate systems and the global coordinate system; identify, from the first points and the second points, locations of a point corresponding to a portion of the marine vessel and a point corresponding to another portion, respectively; determine a measured value of a dimension of the marine vessel using the points corresponding to the portions of the marine vessel; determine whether a difference between the measured value and a provided value of the dimension exceeds a threshold; and in response, generate an alert.

24 Claims, 7 Drawing Sheets

400

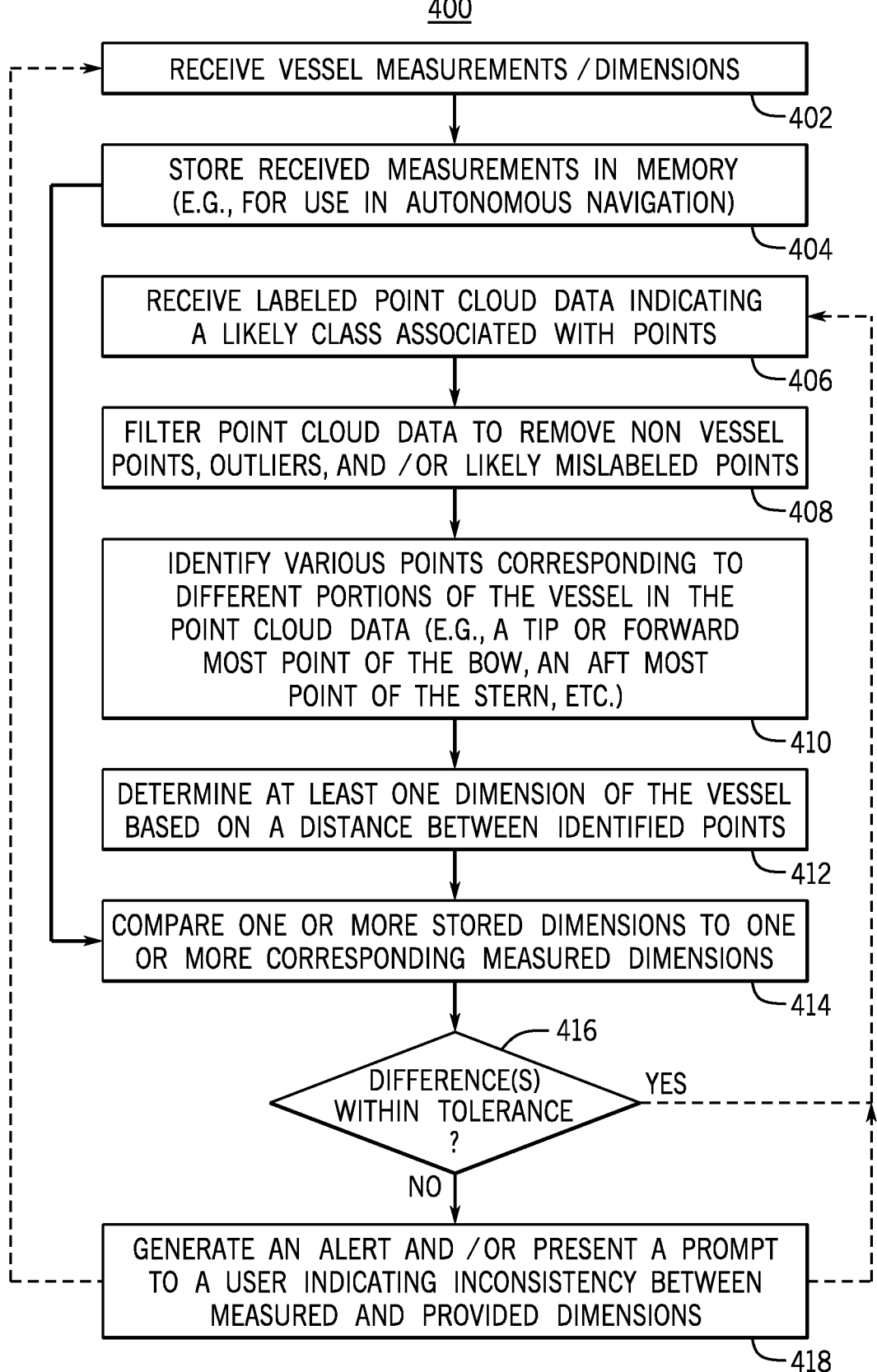

RECEIVE VESSEL MEASUREMENTS / DIMENSIONS
402

STORE RECEIVED MEASUREMENTS IN MEMORY
(E.G., FOR USE IN AUTONOMOUS NAVIGATION)
404

RECEIVE LABELED POINT CLOUD DATA INDICATING
A LIKELY CLASS ASSOCIATED WITH POINTS
406

FILTER POINT CLOUD DATA TO REMOVE NON VESSEL
POINTS, OUTLIERS, AND / OR LIKELY MISLABELED POINTS
408

IDENTIFY VARIOUS POINTS CORRESPONDING TO
DIFFERENT PORTIONS OF THE VESSEL IN THE
POINT CLOUD DATA (E.G., A TIP OR FORWARD
MOST POINT OF THE BOW, AN AFT MOST
POINT OF THE STERN, ETC.)
410

DETERMINE AT LEAST ONE DIMENSION OF THE VESSEL
BASED ON A DISTANCE BETWEEN IDENTIFIED POINTS
412

COMPARE ONE OR MORE STORED DIMENSIONS TO ONE
OR MORE CORRESPONDING MEASURED DIMENSIONS
414

416
DIFFERENCE(S)
WITHIN TOLERANCE
?
YES
NO

GENERATE AN ALERT AND / OR PRESENT A PROMPT
TO A USER INDICATING INCONSISTENCY BETWEEN
MEASURED AND PROVIDED DIMENSIONS
418

FIG. 4

SYSTEMS AND METHODS FOR CONFIRMING DIMENSIONS OF A MARINE VESSEL USING A VISION SYSTEM ON THE MARINE VESSEL

FIELD

The present disclosure generally relates to systems and methods for confirming dimensions of a marine vessel using a vision system on the marine vessel.

BACKGROUND

The following U.S. Patents are incorporated herein by reference, in entirety:

U.S. Pat. No. 9,927,520 discloses a method of detecting a collision of the marine vessel, including sensing using distance sensors to determine whether an object is within a predefined distance of a marine vessel, and determining a direction of the object with respect to the marine vessel. The method further includes receiving a propulsion control input at a propulsion control input device, and determining whether execution of the propulsion control input will result in any portion of the marine vessel moving toward the object. A collision warning is then generated.

U.S. Pat. No. 10,259,555 discloses a method for controlling movement of a marine vessel near an object, including accepting a signal representing a desired movement of the marine vessel from a joystick. A sensor senses a shortest distance between the object and the marine vessel and a direction of the object with respect to the marine vessel. A controller compares the desired movement of the marine vessel with the shortest distance and the direction. Based on the comparison, the controller selects whether to command the marine propulsion system to generate thrust to achieve the desired movement, or alternatively whether to command the marine propulsion system to generate thrust to achieve a modified movement that ensures the marine vessel maintains at least a predetermined range from the object. The marine propulsion system then generates thrust to achieve the desired movement or the modified movement, as commanded.

U.S. Pat. No. 10,429,845 discloses a marine vessel is powered by a marine propulsion system and movable with respect to first, second, and third axes that are perpendicular to one another and define at least six degrees of freedom of potential vessel movement. A method for controlling a position of the marine vessel near a target location includes measuring a present location of the marine vessel, and based on the vessel's present location, determining if the marine vessel is within a predetermined range of the target location. The method includes determining marine vessel movements that are required to translate the marine vessel from the present location to the target location. In response to the marine vessel being within the predetermined range of the target location, the method includes automatically controlling the propulsion system to produce components of the required marine vessel movements one degree of freedom at a time during a given iteration of control.

U.S. Pat. No. 11,403,955 discloses a propulsion control system on a marine vessel that includes at least one propulsion device configured to propel the marine vessel and at least one proximity sensor system configured to generate proximity measurements describing a proximity of an object with respect to the marine vessel. The system further includes a controller configured to receive proximity measurements, access a preset buffer distance, and calculate a velocity limit in a direction of the object for the marine vessel based on the proximity measurements and the preset buffer distance so as to progressively decrease the velocity limit as the marine vessel approaches the preset buffer distance from the object.

U.S. Pat. No. 11,436,927 discloses a system for proximity sensing on a marine vessel that includes a main inertial measurement unit (IMU) positioned at a main installation attitude and a main location, a first proximity sensor configured to measure proximity of objects from a first sensor location, and a first sensor IMU positioned at the first sensor location and at a first installation attitude. A sensor processor is configured to receive main IMU data from the main IMU and first IMU data from the first sensor IMU, and then determine a relative orientation transform between the main installation attitude and the first installation attitude by comparing the main IMU data and the first IMU data, and then determine a relative position transform between the main location and the first sensor location based on the relative orientation transform, the main IMU data, and the first IMU data.

SUMMARY

In accordance with some embodiments of the disclosed subject matter, system for confirming dimensions of a marine vessel using a vision system on the marine vessel is provided, the system comprising: a plurality of cameras, including at least a first camera and a second camera, wherein each of the plurality of cameras is configured to be mounted to the marine vessel with an associated field of view of an environment of the marine vessel; one or more hardware processors configured to: determine a measured value of a dimension of the marine vessel based on a distance between a first point and a second point located using data from the plurality of cameras; determine whether a difference between the measured value of the dimension of the marine vessel and a provided value of the dimension exceeds a threshold; and in response to determining that the difference between the measured value of the dimension of the marine vessel and the provided value of the dimension exceeds the threshold, generate an alert.

In some embodiments, each of the plurality of cameras is associated with a three-dimensional camera coordinate system, and wherein the one or more hardware processors are further configured to: receive three-dimensional location information associated with each of a first plurality of points on the marine vessel in a three-dimensional global coordinate system, wherein the three-dimensional location information associated with each of the first plurality of points is based on calibration information indicative of a transform between a first camera coordinate system associated with the first camera and the global coordinate system; receive three-dimensional location information associated with each of a second plurality of points on the marine vessel in the three-dimensional global coordinate system, wherein the three-dimensional location information associated with each of the second plurality of points is based on calibration information indicative of a transform between a second camera coordinate system associated with the second camera and the global coordinate system; identify, based on the first plurality of points, a location of a first point corresponding to a first portion of the marine vessel; and identify, based on the second plurality of points, a location of a second point corresponding to a second portion of the marine vessel.

In some embodiments, the dimension is a length of the marine vessel, the first portion of the marine vessel is a bow of the marine vessel, the first point is a tip of the bow in the first plurality of points, the second portion of the marine vessel is a stern of the marine vessel, and the second point is an aft-most point of the stern in the second plurality of points.

In some embodiments, the one or more hardware processors are further configured to: receive classification information associated with the first plurality of points, wherein the classification information includes an indication of a predicted class of a plurality of classes of each point in the first plurality of points, and wherein the plurality of classes includes: at least one ego vessel class indicating that the point is predicted to correspond to a point on the marine vessel;

determine, based on the classification information, that the first point is predicted to be a point on the marine vessel; and determine that the first point is located farthest forward of points predicted to be a point on the marine vessel.

In some embodiments, the first plurality of points are points predicted to be a point on the marine vessel, and wherein the one or more hardware processors are further configured to: filter any points in the first plurality of points that are located more than a predetermined distance from a point predicted to be a point on the marine vessel, thereby generating a first subset of points; and determine that the first point is located farthest forward of points predicted to be a point on the marine vessel among the first subset of points.

In some embodiments, the three-dimensional location information associated with each of a first plurality of points comprises point cloud data.

In some embodiments, the one or more hardware processors are further configured to: receive three-dimensional location information associated with each of a fifth plurality of points on the marine vessel in a three-dimensional global coordinate system, wherein the three-dimensional location information associated with each of the fifth plurality of points is based on calibration information indicative of a transform between the first camera coordinate system associated with the first camera and the global coordinate system; receive three-dimensional location information associated with each of a sixth plurality of points on the marine vessel in the three-dimensional global coordinate system, wherein the three-dimensional location information associated with each of the sixth plurality of points is based on calibration information indicative of a transform between the second camera coordinate system associated with the second camera and the global coordinate system; identify, based on the fifth plurality of points, a location of a fifth point corresponding to the first portion of the marine vessel; identify, based on the sixth plurality of points, a location of a sixth point corresponding to the second portion of the marine vessel; determine a second measured value of the dimension of the marine vessel based on a distance between the fifth point and the sixth point; determine whether a difference between the second measured value of the dimension of the marine vessel and the provided value of the dimension exceeds the threshold; and in response to determining that the difference between the measured value of the dimension of the marine vessel and the provided value of the dimension exceeds the threshold, generate a calibration alert.

In some embodiments, the one or more hardware processors are further configured to: receive, from memory, dimensions associated with the marine vessel, including the provided value of the dimensions.

In some embodiments, the one or more hardware processors are further configured to: receive three-dimensional location information associated with each of a third plurality of points on the marine vessel in a three-dimensional global coordinate system, wherein the three-dimensional location information associated with each of the third plurality of points is based on calibration information indicative of a transform between a third camera coordinate system associated with a third camera and the global coordinate system; receive three-dimensional location information associated with each of a fourth plurality of points on the marine vessel in the three-dimensional global coordinate system, wherein the three-dimensional location information associated with each of the second plurality of points is based on calibration information indicative of a transform between a second camera coordinate system associated with the second camera and the global coordinate system; identify, based on the third plurality of points, a location of a third point corresponding to a third portion of the marine vessel; identify, based on the fourth plurality of points, a location of a fourth point corresponding to a fourth portion of the marine vessel; determine a measured value of a second dimension of the marine vessel based on a distance between the third point and the fourth point; determine that a difference between the measured value of the second dimension of the marine vessel and a provided value of the second dimension exceeds a second threshold; and in response to determining that the difference between the measured value of the second dimension of the marine vessel and the provided value of the second dimension exceeds the second threshold, generate the alert.

In some embodiments, the dimension is a width of the marine vessel, the third portion of the marine vessel is a port side of the marine vessel, the third point is a point along the port side of the marine vessel, the fourth portion of the marine vessel is a starboard side of the marine vessel, and the fourth point is a point along the starboard side of the marine vessel.

In some embodiments, the threshold is based on a first accuracy metric associated with the first camera and a second accuracy metric associated with the second camera.

In some embodiments, the first accuracy metric is based on a distance from the first camera to the first point, the second accuracy metric is based on a distance from the second camera to the second point, and the threshold is based on a sum of the first accuracy metric and the second accuracy metric.

In some embodiments, the alert indicates that the measured value of the dimension is inconsistent with the provided value of the dimension.

In some embodiments, the one or more hardware processors are further configured to: cause a prompt to be presented to a user based on the alert.

In accordance with some embodiments of the disclosed subject matter, a method for confirming dimensions of a marine vessel using a vision system on the marine vessel is provided, the method comprising: determining a measured value of a dimension of the marine vessel based on a distance between a first point and a second point located using data from a plurality of cameras, including a first camera and a second camera, wherein each of the plurality of cameras is configured to be mounted to the marine vessel with an associated field of view of an environment of the marine vessel; determining whether a difference between the measured value of the dimension of the marine vessel and a provided value of the dimension exceeds a threshold; and in response to determining that the difference between the measured value of the dimension of the marine vessel and the provided value of the dimension exceeds the threshold, generating an alert.

In accordance with some embodiments of the disclosed subject matter, system for monitoring calibration of a vision system on a marine vessel is provided, the system comprising: a plurality of cameras, including at least a first camera, wherein each of the plurality of cameras is configured to be mounted to the marine vessel with an associated field of view of an environment of the marine vessel, and wherein each of the plurality of cameras is associated with a three-dimensional camera coordinate system; one or more hardware processors configured to: receive three-dimensional location information associated with each of a first plurality of points on the marine vessel in a three-dimensional global coordinate system, wherein the three-dimensional location information associated with each of the first plurality of points is based on calibration information indicative of a transform between a first camera coordinate system associated with the first camera and the global coordinate system; identify, based on the first plurality of points, a location of a first point corresponding to a first portion of the marine vessel; store the location of the first point in memory; receive three-dimensional location information associated with each of a second plurality of points on the marine vessel in a three-dimensional global coordinate system, wherein the three-dimensional location information associated with each of the second plurality of points is based on calibration information indicative of a transform between the first camera coordinate system associated with the first camera and the global coordinate system; identify, based on the second plurality of points, a location of a second point corresponding to the first portion of the marine vessel; determine a distance between the location of the first point and the location of the second point determine whether the distance exceeds a threshold; and in response to determining that the distance exceeds the threshold, generate an alert.

In some embodiments, the threshold is based on an accuracy metric associated with the first camera and a distance from the first camera to the first point.

In some embodiments, the one or more hardware processors are further configured to: identify the first point in the first plurality of points as a first point of interest; identify the second point in the second plurality of points as a second point of interest; and determine that the second point corresponds to a same portion of the marine vessel based on one or more characteristics of the first point of interest and the second point of interest.

In some embodiments, the three-dimensional location information associated with each of a first plurality of points comprises point cloud data.

Various other features, objects, and advantages of the disclosed subject matter can be more fully appreciated with reference to the following description taken together with the drawings.

BRIEF DESCRIPTION OF THE DRAWINGS

The present disclosure is described with reference to the following drawings.

FIG. 4 shows an example of a process for confirming dimensions of a marine vessel using a vision system on the marine vessel in accordance with some embodiments of the disclosure.

DETAILED DESCRIPTION

Understanding vessel geometry is important for autonomous systems to properly avoid obstacles and plan behaviors. For example, if an autonomous control system uses an incorrect hull geometry it can lead to an increased risk of collision (e.g., an autonomous control system encroaching on, or making unwanted contact with, obstacles) due to the vessel occupying space that is not accounted for by the autonomous control system. As another example, if an autonomous control system uses an incorrect hull geometry it can lead to the autonomous control system planning unnecessarily conservative paths or indicating that an area cannot be safely navigated due to an incorrectly large vessel geometry. While a high-volume boat builder likely has the resources to provide accurate measurements (e.g., within firmware), dimensions may be entered manually by low-volume builders and/or in connection with aftermarket alterations made to a boat. Relatively simple (and common) mistakes, such as inadvertently entering an incorrect value, or entering values in the wrong units (e.g., using feet rather than meters, or vice versa) can have a large impact on performance of autonomous systems.

In some embodiments, mechanisms described herein can utilize a perception system of a vessel (e.g., a vision system that utilizes depth cameras) to automatically estimate a dimension(s) of vessel, and compare the measured dimension(s) to a provided dimension(s) of the vessel. In response to determining that the difference is greater than a threshold (e.g., based on an accuracy of the depth cameras), in some embodiments, mechanisms described herein can generate an alert (e.g., indicating that the provided dimensions and measured dimensions are inconsistent). Additionally, in some embodiments, mechanisms described herein can monitor a position of one or more points of interest that can be expected to remain in a fixed position. If a location changes over time it can indicate that calibration of the perception system may have degraded.

Figure 1:
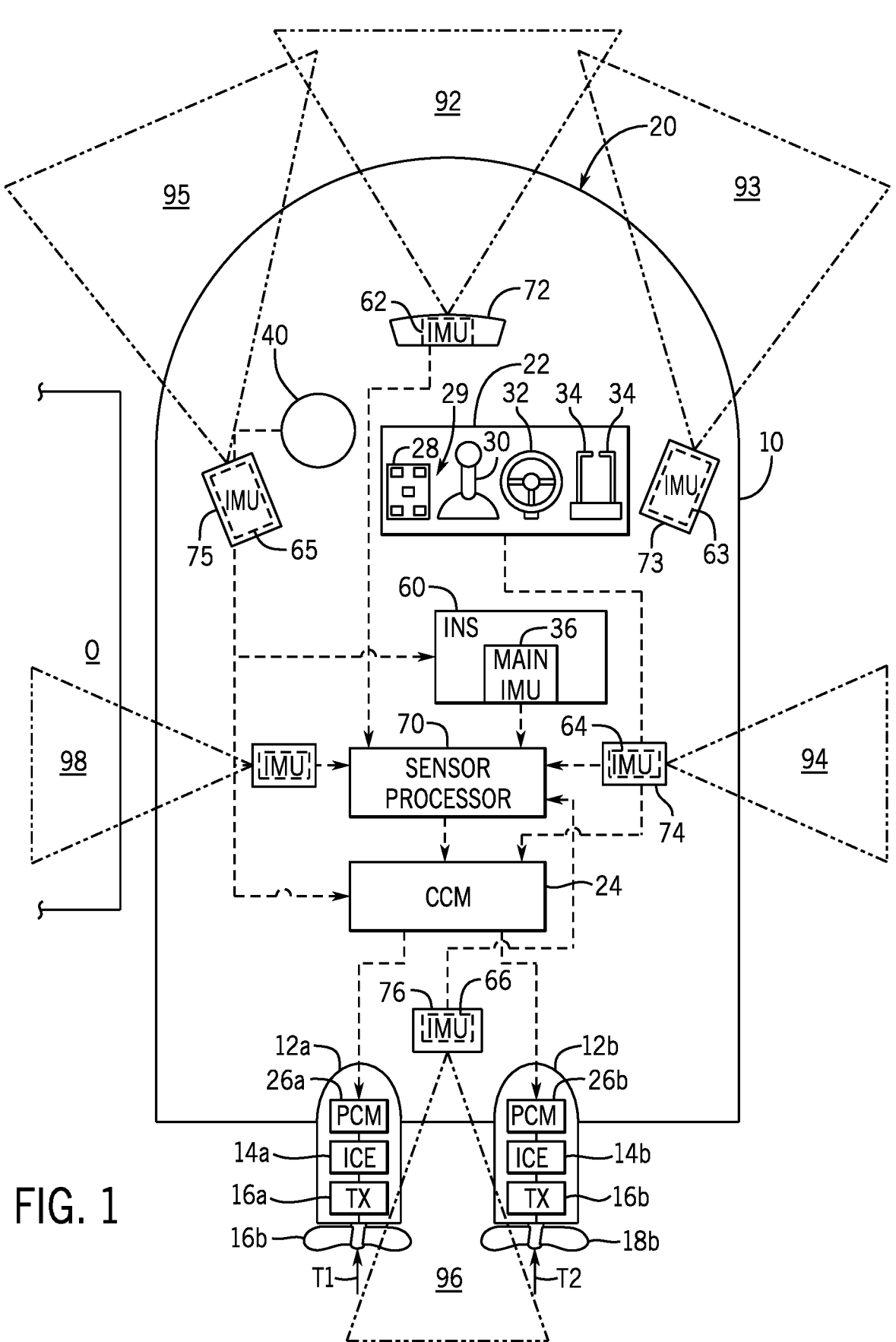
FIG. 1 shows an example of propulsion system on a marine vessel in accordance with some embodiments of the disclosure.

FIG. 1 shows an example of a schematic representation of a propulsion system on a marine vessel in accordance with some embodiments of the disclosed subject matter. FIG. 1 shows a marine vessel 10 equipped with a propulsion system 20 on marine vessel 10 configured in accordance with some embodiments of the disclosed subject matter. In some embodiments, propulsion system 20 can be configured to operate, for example, in a joysticking mode in which a joystick is operated by a user to control vessel movement within an x/y plane, among other modes (e.g., as described hereinbelow). In some embodiments, propulsion system 20 can include first and second propulsion devices 12a, 12b that produce first and second thrusts T1, T2 to propel the vessel 10. First and second propulsion devices 12a, 12b are illustrated as outboard motors, but can alternatively be inboard motors, stern drives, jet drives, pod drives, any other suitable propulsion device, or combinations thereof. Each propulsion device can be provided with an engine 14a, 14b operatively connected to a transmission 16a, 16b, in turn, operatively connected to a propeller 18a. 18b.

In some embodiments, vessel 10 can also house various control elements that comprise part of the marine propulsion system 20. For example, marine propulsion system 20 can comprise an operation console 22 in signal communication, for example via a controller area network (CAN) bus (e.g., as described in U.S. Pat. No. 6,273,771), with a controller 24, such as for example a command control module (CCM), and with propulsion control modules (PCM) 26a, 26b associated with the respective propulsion devices 12a, 12b. Each of controller 24 and PCMs 26a, 26b can include memory and a programmable processor. Each control module 24, 26a, 26b can include one or more processors communicatively connected to a respective storage system comprising a computer-readable medium that includes volatile and/or nonvolatile memory upon which computer-readable code and data can be stored. Additionally or alternatively, in some embodiments, a processor(s) of one or more of control modules 24, 26a, 26b can be communicatively connected to a shared storage system comprising a computer-readable medium that includes volatile and/or nonvolatile memory upon which computer-readable code and data can be stored. In some embodiments, each processor can access computer-readable code and, upon executing the code, carry out one or more functions, such as vessel measurement functions and/or calibration monitoring functions, as described in detail below.

In some embodiments, operation console 22 can include any suitable number of user input devices, such as, a keypad 28, a joystick 30, a steering wheel 32, and/or one or more throttle/shift levers 34. Each of these devices can be configured to input commands to controller 24, which can, in turn, communicate control instructions to first and second propulsion devices 12a, 12b by communicating with the PCMs 26a, 26b. In some embodiments, steering wheel 32 and throttle/shift lever(s) 34 can function in a conventional manner, such that rotation of steering wheel 32, for example, activates a transducer that provides a signal to controller 24 regarding a desired direction of the vessel 10. Controller 24 can, in turn, send signals to PCMs 26a, 26b (and/or thrust vector module(s) (TVMs), or additional modules if provided), which in turn can activate steering actuators to achieve desired orientations of the propulsion devices 12a, 12b. In some embodiments, propulsion devices 12a, 12b can be independently steerable about a respective steering axis. Throttle/shift lever(s) 34 can send signals to controller 24 regarding the desired gear (e.g., forward, reverse, or neutral) of transmissions 16a, 16b and desired rotational speed of engines 14a, 14b of propulsion devices 12a, 12b. Controller 24 can, in turn, send signals to PCMs 26a, 26b, which in turn activate electromechanical actuators in transmissions 16a, 16b and engines 14a, 14b for shift and throttle, respectively. A manually operable input device, such as joystick 30, can also be used to provide signals to controller 24. In some embodiments, joystick 30 can be used to allow an operator of vessel 10 to manually maneuver vessel 10, such as to achieve lateral translation or rotation of vessel 10.

In some embodiments, propulsion system 20 can also include one or more depth sensors 72, 73, 74, 75, 76, and 78. In some embodiments, depth sensors 72-78 can form a portion of a vision system associated with vessel 10 (although the vision system may be configured to use sensing modes other than visible light, such as sound-based sensing, radio-based sensing, infrared-based sensing, etc.). Although a limited number of depth sensors are shown (e.g., one perpendicular to each of the bow, stern, and port and starboard sides the vessel 10, and two positioned at an angle between the bow and sides), fewer or more sensors can be provided at each location and/or provided at other locations, such as on a hardtop of the vessel 10. In some embodiments, depth sensors 72-78 can be used to determine a three-dimensional location of an object and/or other feature of an environment (e.g., a water surface) that is within a field of view (e.g., FOVs 92, 93, 94, 95, 96, and 98 shown in FIG. 1, associated with depth sensors 72, 73, 74, 75, 76, and 78 respectively) of the depth sensor with respect to the location of the depth sensor (e.g., distance to various points on an object and a direction associated with each of the various points). For example, depth sensors 72-78 can be implemented using one or more of depth cameras (e.g., implemented using stereoscopic imaging techniques, structured light imaging techniques, continuous-wave time-of-flight imaging techniques, direct time-of-flight imaging techniques, etc.), three-dimensional laser range finders (e.g., implemented using light detection and ranging (lidar) techniques), radars, sonars, and/or other devices individually capable of determining both the distance and direction to points on an object and/or other feature relatively accurately (e.g., on the order of several to tens of centimeters (cm) at relatively close ranges on the order of several to tens of meters, such as an accuracy of about +/−3 cm at 5 meters (m) and +/−13 cm at 10 m for stereoscopic cameras), e.g., the relative position of various points on an object O (such as a dock, a seawall, a slip, another vessel, a person, a portion of a bridge, a portion of a dam, a relatively large rock, a tree, etc.) with respect to each sensor 72-78 having a field of view that includes object O. In some embodiments, a 3D location of object O and/or various points on object O with respect to vessel 10 can be determined (e.g., by a sensor processor 70) using the location of object O and/or various points on object O determined by one or more of depth sensors 72-78. Additionally, in some embodiments, a 3D location of points of vessel that fall within a sensor FOV can be determined (e.g., by sensor processor 70) using the location of points on vessel 10 determined by one or more of depth sensors 72-78. In some embodiments, a calibration process can be performed to determine a set of transforms that can be used to convert a location from a local coordinate system used by a particular depth sensor (sometimes referred to herein as a camera coordinate system, although it can be a coordinate system used by another type of depth sensor, such as a lidar or sonar-based sensor) to the corresponding location in a global coordinate system used by vessel 10 (e.g., used to perform autonomous navigation processes, such as automatically guiding vessel 10 during docking, automatically guiding vessel 10 during trailer loading or unloading, automatically avoiding collisions with objects via a virtual bumper or buffer zone, autonomous navigation through areas that include other vessels and/or other obstacles, etc.). The camera coordinate system can define a local reference frame for a particular camera (or other type of depth sensor), and the global coordinate system can define a reference frame that to which each camera (or other type of depth sensor) is calibrated, which can be referred to as a common reference frame, a global reference frame, or a world reference frame (note that the global coordinate system can be independent and distinct from the geographical coordinate system of latitude and longitude often used to designate locations on Earth).

In some embodiments, a camera coordinate system can be defined relative to a center of an imaging plane (e.g., with an origin at a center of the imaging plane, a depth axis extending perpendicular to the imaging plane, and lateral axes extending perpendicular to the depth axis) of the camera. In some embodiments, the camera coordinate system can use any suitable type of coordinate system, such as a 3D Cartesian coordinate system, a spherical coordinate system, a cylindrical coordinate system, etc. Note that the type of coordinate system used to define the camera coordinate system can vary based on the type of sensor being used. For example, depth cameras can use a Cartesian coordinate system that defines a depth axis (e.g., a z-axis) that extends perpendicular to the imaging plane of the camera (e.g., an imaging plane associated with an image sensor of the camera), and lateral coordinates (e.g., an x-axis and a y-axis) that extend parallel to the imaging plane and can be used to define the horizontal and vertical distance of a point from an optical axis of the camera. As another example, a scanning lidar that sweeps across a scene using a laser line or single laser point can use a cylindrical coordinate system that defines a depth axis (e.g., an r-axis) that extends perpendicular to the light detector(s) (e.g., an imaging plane associated with an area sensor, an imaging axis of a line sensor), and lateral coordinates (e.g., a z-axis and a θ coordinate) that can be used to define the angular distance (e.g., in degrees or radians) and vertical distance of a point from reference axes of the lidar system.

In some embodiments, a global coordinate system (sometimes referred to as global coordinates or world coordinates) can be defined relative to a particular point on vessel 10. For example, a coordinate system of a particular depth sensor can be used as the basis for the global coordinate system (e.g., a front-facing camera, such as depth sensor 72), and locations of points in an environment of vessel 10 can be defined based on the distance from an origin of that camera coordinate system. In such an example, an offset can be used to determine a location of a particular point on the vessel (e.g., a point of navigation, such as center of gravity (COG) or center of rotation (COR) of vessel 10). As another example, locations of points in an environment of vessel 10 can be defined based on the distance from a COG or COR of vessel 10. In some embodiments, the global coordinate system can use any suitable type of coordinate system, such as a 3D Cartesian coordinate system, a spherical coordinate system, a cylindrical coordinate system, etc.

In some embodiments, sensors 72-78 can determine and/or provide information regarding a location of an object in camera coordinates and using any suitable format (e.g., providing information using a depth image(s) such as an RGBD image, or using a point cloud in any suitable file format). Additionally or alternatively, in some embodiments, sensors 72-78 can determine and/or provide information regarding a location of an object in global coordinates (e.g., using a transform between camera coordinates and global coordinates identified during a calibration procedure) and using any suitable format (e.g., providing information using a depth image(s) such as an RGBD image, or using a point cloud in any suitable file format). In some embodiments, sensors 72-78 can provide position information for various points within that sensors FOV to one or more controllers, such as to sensor processor 70 and/or controller 24 via any suitable communication network, such as by way of a dedicated bus connecting the sensors to a controller, a CAN bus, or wireless network link(s), as described below. In some embodiments, given the large amount of proximity data produced by depth sensors 72-78, the connection between sensors 72-78 and sensor processor 70 can be via a dedicated bus or network connection. Such a dedicated bus or network connection can be separate from the vessel network (e.g., including a CAN bus) in order to facilitate transmission of a large amount of depth measurement data (and, in some embodiments, IMU data) to sensor processor 70. Such massive data transmission may not be possible on a typical vessel network, such as a CAN bus or wireless network being used for communication by multiple devices. In some embodiments, sensor processor 70 can be configured to communicate filtered data on the vessel network, such as a CAN bus or wireless network. Additionally or alternatively, a dedicated communication link can be provided between sensor processor 70 and a propulsion controller, such as central controller 24.

In some embodiments, depth sensors 72-78 can include different types of sensors (e.g., depending on the distance between vessel 10 and an object, such as object O). For example, radar sensors can be used to detect objects at further distances, and cameras, sonic sensors, and/or lidar can be used for objects at closer distances. Note that depth camera sensors can be used, alone or in combination with any of the sensors described above, for example, to provide object location information to controller 24. Sensors 72-78 can be placed at positions on vessel 10 so that the sensor is at a height and facing a direction suitable to detect objects that vessel 10 is likely to encounter. Additionally, sensors 72-78 (and/or additional sensors) can be placed to have at least partially overlapping fields of view (e.g., as shown in FIG. 1, and as described below in connection with FIG. 2). Note that optimal sensor positions can vary depending on vessel size and configuration.

In FIG. 1, the depth sensors shown are positioned to observe multiple regions around vessel 10, including the front, sides, and stern of vessel 10, and include a front-facing sensor 72, a front-starboard-facing sensor 73, a starboard-facing sensor 74, a front-port-facing sensor 73, a rear-facing sensor 76, a port-facing sensor 78. In some embodiments, one or more depth sensors can be placed on a hard top of marine vessel 10 and arranged such that the fields of view of the one or more depth sensors, combined, cover the entire 360° area surrounding vessel 10 (although there may be blind spots relatively close to vessel 10, such as where the hull obstructs the field of view). Note also that the relevant controller, such as sensor processor 70, can selectively operate any one or more of various different sensors (e.g., including depth cameras, radars, lidars, ultrasonics, or any other suitable sensor technology) to sense the location of objects in an environment of vessel 10.

In some embodiments, sensor processor 70 can integrate sensor data provided from one or more types of sensor into one or more models of an environment of vessel 10, objects within the environment, and/or vessel 10 itself. In such embodiments, the model(s) can be in any suitable format, such as one or more point clouds, one or more maps, one or more occupancy grids, and/or one or more data structures including a list of surrounding objects (e.g., including the object's size and position), integrating location information from multiple sensors. As described above, the location data from different sensors can be translated into a common reference frame (e.g., defined by the global coordinate system).

Autonomous and/or advanced operator assistance (sometimes referred to as semi-autonomous) controls for improved vessel handling qualities generally requires a relatively accurate ability to identify objects in an environment of vessel 10, often using multiple depth sensors mounted on vessel 10. In general, such depth sensors can be positioned to detect the objects in the marine environment surrounding marine vessel 10, such as a dock, a swimmer, or other obstruction in the current path and/or other potential paths of vessel 10. Each sensor can provide location information of features within its field of view relative to its own frame of reference (e.g., in the camera coordinate system associated with that sensor) and/or in a common frame of reference (e.g., in the global coordinate system). For example, the location information can be transformed from the respective camera coordinates at the camera and/or at a controller (e.g., sensor processor 70) using one or more transforms derived during a calibration procedure. Depending on the type of sensor(s), the application of use, boat size, hull shape, etc., multiple sensor types and sensor locations may be required to provide adequate sensing around the marine vessel for operation in all marine environments. To create a cohesive dataset that can be used for purposes of vessel control and vessel navigation, including autonomous vessel navigation and automatic maneuver-limiting control (e.g., velocity limiting for object avoidance, maintenance of a buffer zone, etc.), information from multiple sources (e.g., multiple depth sensors, multiple types of depth sensors, proximity sensors, etc.), can be translated to a common reference frame. To accurately translate the information to the common reference frame typically requires precise knowledge of the posture (e.g., including 3D location, installation attitude, and/or orientation) of each sensor relative to the common reference frame such that the information received from each sensor can be translated appropriately. Regardless of what type of model(s) is being generated, the relevant sensor installation posture of each sensor on the marine vessel must be known so that the location information from each respective sensor can be properly interpreted for navigation purposes. Note that the installation posture of each sensor can be calculated or otherwise determined explicitly, however, such information is difficult to determine with sufficient accuracy. Alternatively, the installation posture of each sensor can be implicit in the transforms determined during a calibration procedure (e.g., transforms that are optimized using machine learning techniques may not require explicit knowledge of the location of the sensors). In some embodiments, a calibration procedure can begin with an initial estimate of camera poses (e.g., based on measurement and/or a CAD model), and the calibration procedure can include refining the initial estimate (e.g., via an optimization algorithm).

In some embodiments, autonomous and/or advanced operator assistance (sometimes referred to as semi-autonomous) controls for improved vessel handling qualities generally requires that dimensions of vessel 10 be known, such that autonomous and/or advanced operator assistance controls can accurately determine whether vessel 10 is likely to avoid obstacles, and/or is being positioned correctly with respect to other objects (e.g., in an autonomous docking procedure). In some embodiments, information about the dimensions of vessel 10 can be provided using any suitable technique or combination of techniques, can be provided from any suitable source, and can be in any suitable format. Additionally, in some embodiments, the dimensions can be provided prior to installation of the controller within vessel 10, or after installation of the controller within vessel 10. For example, in some embodiments, dimensions can be included in software and/or firmware loaded on a controller (e.g., CCM 24, sensor processor 70, etc.). In such an example, the dimensions can include information such as length of vessel 10, a beam of vessel 10, a width of the stern of vessel 10, a draft of vessel 10, a height of vessel 10, a clearance of vessel 10, etc. Additionally or alternatively, dimensions can include one or more two-dimensional and/or three-dimensional models (e.g., based on a computer-aided design (CAD) model), which can be used to determine a dimension at various other points on vessel 10 (e.g., a width of the stern, a width at various points along a curved portion of the bow, etc.). As another example, in some embodiments, dimensions can be provided (e.g., via a communication link) during a calibration procedure. In such an example, the dimensions can be provided as a file (e.g., a text file, a CAD file, etc.) uploaded from a device being used to facilitate the calibration (e.g., a laptop or other computing device of a service technician or other user performing the calibration), as text inputs to a user interface (e.g., a user interface presented by a laptop of a service technician performing the calibration, a user interface presented by a display of vessel 10, etc.), or using any other suitable technique. In some embodiments, dimensions can be based on manufacturer specifications for vessel 10, a model (e.g., a CAD model) used in the design and/or manufacture of vessel 10, and/or measurements of vessel 10 gathered before and/or during a calibration procedure (e.g., taken using an automated device (s), such as a depth camera, lidar, etc., and/or taken using a manual device, such as a measuring tape). In some embodiments, dimensions and/or measurements of vessel 10 can be stored in memory (e.g., memory associated with CCM 24, sensor process 70, and/or any other suitable memory).

In some embodiments, vessel 10 can have a main inertial measurement unit (IMU) installed at a known location on the marine vessel. Referencing the example in FIG. 1, main IMU 36 can be part of an inertial navigation system (INS) such as including one or more micro-electromechanical systems (MEMS). For example, INS 60 can include a MEMS angular rate sensor, such as a rate gyro, a MEMS accelerometer, and a magnetometer. Such INS systems are well known in the relevant art. Additionally or alternatively, in some embodiments, motion and angular position (including pitch, roll, and yaw) can be sensed by a differently configured INS 60, or by an attitude heading reference system (AHRS) that provides 3D orientation of vessel 10 by integrating gyroscopic measurements, accelerometer data, and magnetometer data. In some embodiments, INS 60 can receive orientation information from main IMU 36 and can also receive information from a GPS receiver 40 comprising part of a satellite-based radio navigation system, such as the global positioning system (GPS). GPS receiver 40 can be located at a pre-selected fixed position on vessel 10, which provides information related to a position of vessel 10 with respect to a planetary frame of reference (e.g., latitude, longitude, and height with respect to sea level). In some embodiments, main IMU 36 can also be located at a known and fixed position with respect to the center of rotation (COR) and/or center of gravity (COG) of vessel 10 (e.g., a COG when the vessel is empty).

In some embodiments, mechanisms described herein can be configured to determine whether a depth sensor 72-78 has changed its posture with respect to vessel 10 (e.g., due to an impact on or near the sensor, due to a fastener used to secure the sensor in position loosening over time, etc.). For example, in some embodiments, each depth sensor 72, 73, 74, 75, 76, 78 can be associated with a respective IMU 62,

63, 64, 65, 66, 68 provided therewith at a known orientation relative to the view angle, or coordinate system frame, of the respective sensor 72-78. Each sensor IMU 62, 63, 64, 65, 66, 68 can provide IMU data describing linear acceleration, angular acceleration, attitude, and/or heading. For example, each sensor IMU 62-68 can include a rate gyro, an accelerometer, and a magnetometer, and thus the IMU data provided can include rate gyro measurements, accelerometer measurements, and magnetometer measurements. Each sensor IMU 62-68 can be incorporated within a housing of each depth sensor device 72-78, or can be a separately-housed device (e.g., located as close as possible to the respective depth sensor 72-78) installed at a known relative orientation thereto. Alternatively, in some embodiments, IMUs 62-68 can be configured to measure fewer or more parameters. For example, each camera can be associated with one or more accelerometers used to measure acceleration in various dimensions (e.g., three dimensions), and may not include a gyroscope and/or a magnetometer.

In some embodiments, IMU data from each sensor IMU 62-68 and/or main IMU 36 can be provided to sensor processor 70 and/or to another controller (e.g., CCM 24, INS 60, etc.). For example, the IMU data from each sensor IMU 62-68 can be transmitted along with the feature location information from the respective depth sensor 72-78. Additionally or alternatively, in some embodiments, each sensor IMU 62-68 can have an integrated microprocessor configured to process the respective sensor IMU data and compare the sensor IMU data to main IMU data and determine whether the sensor IMU data is inconsistent with the main IMU data based on the relative location of the sensor IMU with respect to main IMU 36. In some embodiments, as shown in FIG. 1, depth data and/or IMU data can be communicated to sensor processor 70 (and/or any other suitable controller), which can be via any suitable wired or wireless communication technique(s), such as via a dedicated communication bus, wireless transmission protocols (e.g. Bluetooth, Bluetooth Low Energy, ZigBee, etc.), a CAN bus comprising part of the vessel network, etc. Note that the dashed lines in FIG. 1 are meant to show only that the various control elements are capable of communicating with one another, and do not necessarily represent actual wiring connections between the control elements, nor do they represent the only paths of communication between the elements.

In some embodiments, some sensor processing functions can be performed by a separate computing device. For example, sensor processor 70 can communicate processed sensor data to central controller 24, which can utilize the processed data for navigation functions and/or other vessel control functions. In some embodiments, sensor processor 70 can be a dedicated, special-purpose computing system configured to process depth data and/or IMU data from depth sensors 72-78, sensor IMUs 62-68, and/or main IMU 36. As described below, in some embodiments, sensor processor 70 can be associated with its own storage system comprising memory and its own processing system that executes programs and accesses data stored in the memory of sensor processor 70. Additionally or alternatively, in some embodiments, one or more functions described as being performed by sensor processor 70 can be incorporated in a multi-purpose controller, such as sensor processor software stored and executed within controller 24. For example, in some embodiments, controller 24 can control marine vessel navigation, such as autonomous point-to-point navigation, automatic docking, or other advanced operator assistance programs. In some embodiments, central controller 24 can also perform one or more sensor processing functions. Additionally or alternatively, in some embodiments, functions described herein as comprising part of the sensor processor functions can be distributed across two or more processing devices. For example, each depth sensor 72-78 can include one or more processors that are configured to perform certain functions (e.g., segmenting image data to classify one or more objects in the image, generate one or more RGBD images, generate one or more 3D depth maps, generate a point cloud corresponding to the 3D depth map, project points into a global coordinate system). As another example, each IMU 62-68 can include (or otherwise be associated with) one or more processors that are configured to perform calculations to interpret measured IMU data (such as to determine an attitude estimate for the respective IMU, to determine whether the sensor IMU data is inconsistent with main IMU data, etc.) and provide the interpreted IMU data to one or more other processing devices or controllers for execution of subsequent processing steps.

In some embodiments, sensor processor 70 can be programmed and/or otherwise configured to automatically perform a dimension measurement process and/or a sensor calibration monitoring process, in which sensor processor 70 can estimate one or more dimensions of the vessel (e.g., vessel 10), and/or monitor a location of one or more points on the vessel over time. For example, as described below in connection with FIG. 4, sensor processor 70 can identify points corresponding to particular portions of the vessel (e.g., from point cloud data generated by depth sensors), and estimate one or more dimensions of the vessel based on the points. In such an example, sensor processor 70 can compare the dimension(s) determined from the points to a provided dimension(s) (e.g., by a manufacturer, technician, user, etc.). As another example, as described below in connection with FIG. 5, sensor processor 70 can identify points corresponding to fixed portions of the vessel (e.g., from point cloud data generated by depth sensors), and estimate whether the position of the fixed points has changed over time (e.g., with respect to the depth sensor(s) and/or a global coordinate system). In some embodiments, sensor processor 70 (and/or another controller, such as CCM 24), can indicate that the estimated dimension and the provided dimension are not consistent, and/or can cause use of autonomous navigation features to be disabled or otherwise restricted in response to determining that a measured dimension of the vessel is inconsistent with a provided dimension.

Figure 2:
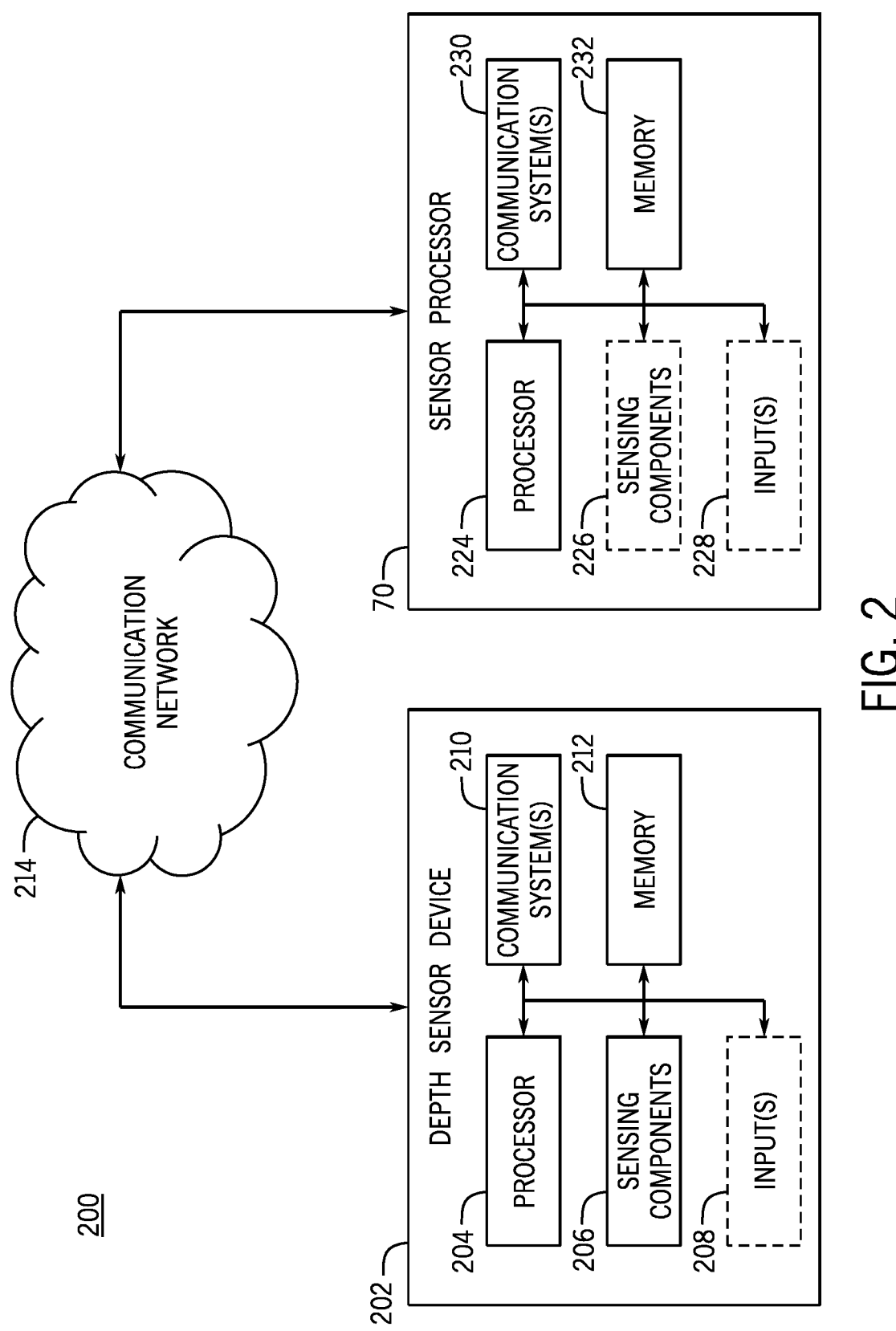
FIG. 2 shows an example of a system for hardware that can be used to implement a sensor device and sensor processor in accordance with some embodiments of the disclosure.

FIG. 2 shows an example of hardware 200 that can be used to implement a depth sensor device 202 and sensor processor 70 in accordance with some embodiments of the disclosed subject matter.

As shown in FIG. 2, in some embodiments, sensor device 202 can include a processor 204, sensing components 206, one or more inputs 208, one or more communication systems 210, and/or memory 212. In some embodiments, processor 204 can be any suitable hardware processor or combination of processors, such as a central processing unit (CPU), an accelerated processing unit (APU), a graphics processing unit (GPU), a field programmable gate array (FPGA), an application specific integrated circuit (ASIC), etc.

In some embodiments, sensing components can include components that are used to determine a three-dimensional location of an object and/or other feature of an environment (e.g., a water surface) that is within a field of view of the depth sensor device 202. In some embodiments, depth sensor device 202 can include components used to implement one or more of depth sensors 72-78.

For example, depth sensor device 202 can be implemented as one or more cameras that include components that facilitate three-dimensional imaging of a region of an environment, such as a stereoscopic camera, a structured light camera, a continuous-wave time-of-flight camera, a direct time-of-flight camera, etc. As another example, depth sensor device 202 can be implemented as one or more lidar devices (e.g., a scanning lidar, a lidar including a 2D array sensor, etc.) that include components that facilitate three-dimensional characterization of a region of an environment. In such an example, a camera(s) (e.g., a two-dimensional camera) can be located to have an overlapping field of view with a lidar device (e.g., such a camera can be co-located), and can be used to capture images that can be used to classify portions of the environment (e.g., using a machine learning model trained to perform image segmentation). As yet another example, depth sensor device 202 can be implemented as one or more sound-based devices (e.g., one or more sonar systems, etc.) that include components that facilitate three-dimensional characterization of a region of an environment. As still another example, depth sensor device 202 can be implemented as one or more radio wave-based devices (e.g., one or more radar systems, etc.) that include components that facilitate three-dimensional characterization of a region of an environment.

In some embodiments, inputs 208 can include any suitable input devices and/or sensors that can be used to receive user input, such as a keyboard, a mouse, a touchscreen, a touchpad, a microphone, a camera, etc. In some embodiments, depth sensor device 202 can omit inputs (e.g., where depth sensor device is an embedded device, or where depth sensor device is not configured for direct end user operation).

In some embodiments, communications systems 210 can include any suitable hardware, firmware, and/or software for communicating information over a communication network 214 and/or any other suitable communication networks. For example, communications systems 210 can include one or more transceivers, one or more communication chips and/or chip sets, etc., that can be used to establish a wired and/or wireless communication link. In a more particular example, communications systems 210 can include hardware, firmware, and/or software that can be used to establish a direct or indirect wired connection and/or a direct or indirect wireless connection, such as a CAN bus connection, a Bluetooth connection, Bluetooth Low Energy connection, a ZigBee connection, a Wi-Fi connection, a cellular connection (e.g., an uplink connection, a downlink connection, or a sidelink connection), an Ethernet connection, etc.

In some embodiments, memory 212 can include any suitable storage device or devices that can be used to store instructions, values, etc., that can be used, for example, by processor 204 to generate depth information of a portion of the environment that characterizes the portion of the environment in three-dimensions, to identify and/or classify one or more objects and/or other features in a scene based on the depth information and/or image information, to communicate with sensor processor 70 via communications system(s) 210, etc. Memory 212 can include any suitable volatile memory, non-volatile memory, storage, or any suitable combination thereof. For example, memory 212 can include random access memory (RAM), read-only memory (ROM), electronically erasable programmable read-only memory (EEPROM), one or more flash drives, one or more hard disks, one or more solid state drives, one or more optical drives, etc. In some embodiments, memory 212 can have encoded thereon a computer program for controlling operation of depth sensor device 202. In such embodiments, processor 204 can execute at least a portion of the computer program to generate depth information, to identify and/or classify one or more objects and/or other features in a scene based on the depth information and/or image information, to transmit information to sensor processor 70, to execute at least a portion of a process for estimating a dimension(s) of a vessel (e.g., a vessel including depth sensor device 202) and/or a process for monitoring calibration of a vision system based on a location of one or more fixed point(s) of the vessel, such as processes described below in connection with FIGS. 4 and 5, etc.

In some embodiments, depth sensor device 202 can include any suitable display device(s) (not shown), such as a computer monitor, a touchscreen, a television, etc.

In some embodiments, communication network 214 can be any suitable communication network or combination of communication networks. For example, communication network 214 can include a Wi-Fi network (which can include one or more wireless routers, one or more switches, and the like), a peer-to-peer network (e.g., a Bluetooth network), a cellular network (e.g., a 3G network, a 4G network, a 5G network, etc., complying with any suitable standard(s), such as CDMA, GSM, LTE, LTE Advanced, 5G NR, etc.), a wired network, etc. In some embodiments, communication network 214 can include one or more portions of a control area network (CAN), a local area network (LAN), a wide area network (WAN), a public network (e.g., the Internet, which may be part of a WAN and/or LAN), any other suitable type of network, or any suitable combination of networks. Communications links shown in FIG. 2 can each be any suitable communications link or combination of communications links, such as wired links, fiber optic links, Wi-Fi links, Bluetooth links, cellular links, etc.

In some embodiments, sensor processor 70 can include a processor 224, a display 226, one or more inputs 228, one or more communications systems 230, and/or memory 232. In some embodiments, processor 224 can be any suitable hardware processor or combination of processors, such as a CPU, an APU, a GPU, an FPGA, an ASIC, etc. In some embodiments, display 226 can include any suitable display devices, such as a computer monitor, a touchscreen, a television, etc. In some embodiments, inputs 228 can include any suitable input devices and/or sensors that can be used to receive user input, such as a keyboard, a mouse, a touchscreen, a microphone, etc. In some embodiments, sensor processor 70 can omit inputs (e.g., where sensor processor 70 is an embedded device that is not configured for direct user interaction). For example, sensor processor 70 can provide results of an analysis to CCM 24, and CCM 24 can use the results to provide an alert (e.g., via a user interface, via a message to a connected device such as a technician laptop or tablet computer, etc.), assist with autonomous control and/or advanced operator assistance control, etc.

In some embodiments, communications systems 230 can include any suitable hardware, firmware, and/or software for communicating information over communication network 214 and/or any other suitable communication networks. For example, communications systems 230 can include one or more transceivers, one or more communication chips and/or chip sets, etc., that can be used to establish a wired and/or wireless communication link. In a more particular example, communications systems 230 can include hardware, firmware, and/or software that can be used to establish a direct or indirect wired connection and/or a direct or indirect wireless connection, such as a CAN bus connection, a Bluetooth connection, Bluetooth Low Energy connection, a ZigBee connection, a Wi-Fi connection, a cellular connection (e.g., an uplink connection, a downlink connection, or a sidelink connection), an Ethernet connection, etc.

In some embodiments, memory 232 can include any suitable storage device or devices that can be used to store instructions, values, etc., that can be used, for example, by processor 224 to analyze depth information received from depth sensor device 202 (and/or any other suitable depth sensor device), to identify and/or classify one or more objects and/or other features in a scene based on the depth information and/or image information, to communicate with depth sensor device 202 via communications system(s) 230, etc. Memory 232 can include any suitable volatile memory, non-volatile memory, storage, or any suitable combination thereof. For example, memory 232 can include RAM, ROM, EEPROM, one or more flash drives, one or more hard disks, one or more solid state drives, one or more optical drives, and the like. In some embodiments, memory 232 can have encoded thereon a computer program for controlling operation of sensor processor 70. In such embodiments, processor 224 can analyze depth information to identify and/or classify one or more objects and/or other features in a scene based on the depth information and/or image information, to receive information from depth sensor device 202, to execute at least a portion of a process for estimating a dimension(s) of a vessel (e.g., a vessel including sensor processor 70) and/or a process for monitoring calibration of a vision system based on a location of one or more fixed point(s) of the vessel, such as processes described below in connection with FIGS. 4 and 5, etc.

Figure 3:
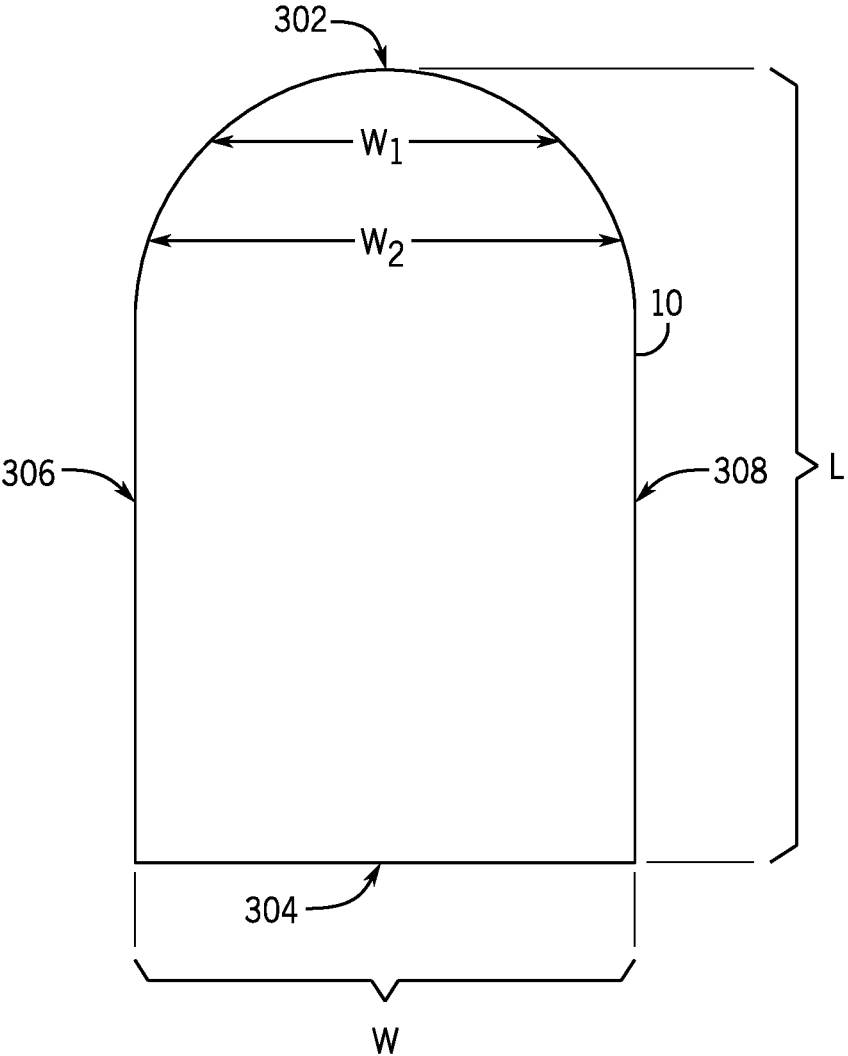
FIG. 3 shows an example of dimensions of a marine vessel that can be measured using a vision system implemented in accordance with some embodiments of the disclosure.

FIG. 3 shows an example of dimensions of a marine vessel that can be measured using a vision system implemented in accordance with some embodiments of the disclosure. In some embodiments, mechanisms described herein can identify one or more points on vessel 10 (e.g., from point cloud data generated by one or more of depth sensors 72-78) that correspond to a particular portion of vessel 10, such as a portion of a bow 302, a portion of a stern 304, a portion of a port side 306, and/or a portion of a starboard side 308. In some embodiments, mechanisms described herein can identify points associated any suitable dimension of vessel 10, such as a length L of vessel 10, a width W of vessel 10 (which can be a beam of vessel 10, a width at stern 304, or any other suitable width), a width $W_1$, $W_2$, etc., at a particular point along a curved portion of bow 302, etc. As described below in connection with FIG. 4 (e.g., at 406-412), any suitable technique or combination of techniques can be used to identify a particular point(s) associated with a portion of vessel 10 that can be used to estimate a dimension of vessel 10.

FIG. 4 shows an example of a process for confirming dimensions of a marine vessel using a vision system on the marine vessel in accordance with some embodiments of the disclosure.

At 402, process 400 can receive vessel measurements/dimensions of a vessel to be analyzed using any suitable technique or combination of techniques. For example, as described above in connection with FIG. 1, in some embodiments, information about dimensions of vessel 10 can be provided prior to installation of a controller (e.g., CCM 24, sensor processor 70, etc.) within vessel 10, or after installation of the controller within vessel 10. In a more particular example, dimensions can be included in software and/or firmware loaded on a controller (e.g., CCM 24, sensor processor 70, etc.). As another example, in some embodiments, dimensions can be provided (e.g., via a communication link) during a calibration procedure. In such an example, the dimensions can be provided as a file (e.g., a text file, a CAD file, etc.) uploaded from a device being used to facilitate the calibration (e.g., a laptop or other computing device of a service technician or other user performing the calibration), as text inputs to a user interface (e.g., a user interface presented by a laptop of a service technician performing the calibration, a user interface presented by a display of vessel 10 such as a multi-function display, etc.), or using any other suitable technique. In some embodiments, the dimensions can be provided to a device being used to facilitate the calibration (e.g., downloaded from a database, retrieved from a database, extracted from a CAD file, extracted from a text file, manually entered using a keyboard, etc.).

Dimensions provided at 402 can include information such as a length L, a width W (e.g., a beam of vessel 10, a width of the stern of vessel 10), a draft of vessel 10, a height of vessel 10, a clearance of vessel 10, etc. Additionally or alternatively, such dimensions can include one or more two-dimensional and/or three-dimensional models (e.g., based on a CAD model), which can be used to determine a dimension at various points on vessel 10 (e.g., a width of the stern, a width at various points along a curved portion of the bow, a length, a beam, etc.).

In some embodiments, dimensions can be based on manufacturer specifications for vessel 10, a model (e.g., a CAD model) used in the design and/or manufacture of vessel 10, and/or measurements of vessel 10 gathered before and/or during a calibration procedure (e.g., taken using an automated device(s), such as a depth camera, lidar, etc., and/or taken using a manual device, such as a measuring tape).

In some embodiments, a computing device (e.g., a computing device of a technician facilitating a calibration procedure, sensor processor 70, CCM 24, etc.) can present a model of the vessel (e.g., based on a CAD model of the vessel) using a display (e.g., a display of the computing device, a multi-function display (MFD) of the vessel, etc.), and can prompt a user to provide input indicating points of the CAD model to use as measurements corresponding to points of the vessel that are within a FOV of at least one depth sensor device. For example, a user can select a tip of the bow and a point on a visible portion of the stern to use as a length dimension. As another example, a user can select a corner of the stern and a second corner of the stern to use as a width dimension. In a particular example, process 400 can present a 3D rendering based on the model, and a user can use an input device (e.g., a mouse, a touchscreen, etc.) to select points from which to determine provided vessel dimensions.

At 404, process 400 can store vessel measurements and/or dimensions received at 402 (and/or values derived from the measurements and/or dimensions) in memory. For example, process 400 can store vessel measurements and/or dimensions in memory of a controller (e.g., memory 232, memory associated with CCM 24, etc.). As another example, process 400 can store vessel measurements and/or dimensions in memory of a device being used to facilitate a calibration procedure (e.g., a laptop, a tablet computer, etc.)

At 406, process 400 can generate and/or receive point cloud data that includes information indicative of a likely class associated with points of the point cloud data. In some embodiments, the point cloud points can be labeled point cloud points generated via another process.

For example, the point cloud data can be based on images captured to perform machine vision processes (e.g., to facilitate autonomous control and/or advanced operator assistance control). Accordingly, process 400 can leverage images (and/or other data) captured for another purpose and can utilize the images to estimate dimensions of the marine vessel (e.g., to corroborate provided measurements, to check a vision system calibration, etc.) and/or to monitor calibration of a vision system of the marine vessel.

In a more particular example, depth sensors can capture images of an environment of a marine vessel with multiple cameras having different fields of view (e.g., using stereoscopic cameras, structured light cameras, continuous-wave time-of-flight cameras, direct time-of-flight cameras), and generate segmentation information based on one or more of the images (e.g., by providing one or more images to a trained machine learning model that was trained to generate segmentation information classifying regions, corresponding to one or more pixels of the image, as most likely belonging to a certain class and/or a probability of the region corresponding to each of various classes). Such segmentation information can include classification information that indicates which of a set of classes different portions of the image are most likely to correspond such as: a class corresponding to features of the vessel associated with the camera(s) that captured an image (e.g., an ego vessel class, which can be limited to a hull or other fixed portions of the ego vessel, or can include other components that may not be fixed, such as outboard motors, cleats, etc.); one or more classes of bodies of water (e.g., water surface, and/or a more specific class(es) such as river, lake, sea, ocean, deep water, shallow water, etc.); one or more classes of structure (e.g., structure, and/or a more specific class(es) such as dock, bridge, building, sea wall or more specific classes such as concrete sea wall or rock sea wall, etc.); one or more classes of vessel (e.g., vessel, ego vessel, boat, motor vehicle, and/or a more specific class(es) such as large boat, small boat, personal watercraft or more specific classes such as jet ski, sail boat, human-powered watercraft or more specific classes such as: canoe; kayak; or standup paddle board, etc.); one or more broad class of vegetation feature (e.g., vegetation, and/or a more specific class(es) such as trees, brush, algae, etc.); the set of classes can include one or more classes of animal (e.g., animal, and/or a more specific class(es) such as person, dog, marine animal, etc.); one or more classes of navigation aid (e.g., navigation aid, and/or a more specific class(es) such as channel marker, buoy, sign, specific types of signs, etc.); one or more classes of open space (e.g., sky, and/or a more specific class(es) such as open sky, clouds, types of clouds, etc.) and/or land (e.g., land, and/or a more specific class(es) such as sand, beach, sandy beach, rocky beach, soil, grass, rock, bluff, vegetation, etc.); etc. In such an example, segmentation information for a pixel can be associated with a point cloud point corresponding to that pixel (e.g., point cloud points can have a location and a classification). In some embodiments, segmentation information can include separate classes for different portions of an ego vessel (e.g., a bow class, a stern class, a starboard class, a port class, a hull class, etc.). Note that other techniques can be used to identify portions of an image that correspond to the vessel, such as one or more trained machine learning models that generate object detection information (e.g., as bounding boxes for a portion of an image including a particular class of object) in lieu of, or in addition to, the segmentation information.

In some embodiments, each point cloud point can be associated with various properties and/or characteristics. For example, point cloud points can be associated with a location in 3D space (e.g., designated using coordinates, such as x,y,z coordinates). As another example, point cloud points can be associated with a label (e.g., indicating a class or classes of object(s) that the point may be part of). As yet another example, point cloud points can be associated with color information (e.g., indicating a color of an object corresponding to the point).

At 408, process 400 can filter the point cloud data to remove points that do not correspond to the vessel, that are outliers, and/or that are likely to be mislabeled, using any suitable technique or combination of techniques. For example, process 400 can remove (e.g., from a dataset being analyzed, from consideration, etc.) any points that are labeled as corresponding to a class other than an ego vessel class (e.g., a class indicating that the point is part of the vessel associated with the vision system that captured the data used to generate the point cloud data).

As another example, process 400 can remove points that are located more than a threshold distance from another point (or multiple points) with the same label. In a more particular example, the threshold can be any suitable distance, such as based on an accuracy metric of the depth sensor(s) that captured the information (e.g., a range-dependent accuracy, such as about 3 centimeters (cm) at a range of about 5 meters, about 13 cm at a range of 10 m, etc., for a stereoscopic camera). In such an example, process 400 can remove any points that are more than the threshold distance from another point (or multiple points). Such points may be likely to be mislabeled and/or outliers (e.g., caused by noise), as it is relatively unlikely that a point on an object, such as a boat, is more than the threshold distance from any other points on that object in the FOV of the depth sensors.

As yet another example, process 400 can remove points that are unlikely to be a fixed portion of the vessel (e.g., outriggers, fishing poles, rigging lines, nets, etc.). In such an example, based on information about vessel 10 (e.g., based on a footprint of vessel 10) and/or based on general characteristics of similar vessels (e.g., the hull of a vessel can be expected to exclude relatively long protrusions, or protrusions thinner than a predetermined thickness such as fishing lines, fishing poles, outriggers, etc.).

At 410, process 400 can identify various points corresponding to different portions of the vessel in the point cloud data. For example, process 400 can identify one or more points that are likely to correspond to a tip of the bow of vessel 10 based on a point that is farthest forward (and that is associated with an indication that it is part of vessel 10). As another example, process 400 can identify one or more points that are likely to correspond to a stern of vessel 10 based on a point that is farthest aft (and that is associated with an indication that it is part of vessel 10). As yet another example, process 400 can identify one or more points that are likely to correspond to a port side and/or a starboard of vessel 10 (e.g., a portion of a gunwale on the port side or starboard side) based on a point that is farthest port at any given location along the vessel in a fore/aft direction (and that is associated with an indication that it is part of vessel 10).

At 412, process 400 can determine at least one dimension of the vessel based on a distance between identified points using any suitable technique or combination of techniques. For example, process 400 can determine a length of the vessel based on a distance (e.g., along a fore-aft direction) between a forward-most point (e.g., a tip of the bow) or a forward-most tip of a front edge (e.g., a curve) of the vessel, and an aft-most point (e.g., the back of the stern) or an aft-most point of a rear edge. In such an example, process 400 can calculate a distance along a single axis. In a more particular example, if an x-axis of a global coordinate system (e.g., with each point having a location x,y,z) is parallel to a keel of vessel 10, process 400 can determine a distance between the points in the x direction, rather than determining a distance along multiple axes, such as a Euclidean distance (e.g., as the bow and keel may be at different heights). For example, a common vessel frame used in marine applications uses +x as forward (e.g., parallel to the heel), +y as starboard, and +z as down.

As another example, process 400 can determine a width of the vessel based on a distance (e.g., along a port-starboard direction) between a port-most point and a starboard-most point. In such an example, process 400 can identify points that are relatively closely aligned along a fore-aft direction, as a width of the vessel may not be consistent along the length of the vessel. In a more particular example, process 400 can determine a width at the stern of vessel 10 by identifying the points that are located at a port-side of the stern and a starboard-side of the stern. As another more particular example, process 400 can group point cloud data into subsets of points based on location. In such an example, points within a particular range of locations along a fore-aft direction (e.g., having an x value within a particular range of x values) can be grouped together, and process 400 can determine a width based on lateral locations (e.g., y values) of a port-most and starboard-most point in the group. In such an example, the point cloud data can be grouped into any suitable number of groups (e.g., at specific values of x, into ranges along a length of the vessel, such as every 3 cm, every 5 cm, every 10 cm, etc.). Additionally or alternatively, in some embodiments, as described above, in some embodiments, process 400 can determine multiple widths along a curved portion of the bow (e.g., at particular distances from a tip of the bow) based on a lateral distance between a port-most and starboard-most points at a particular distance along the curved portion of the bow (e.g., as measured from a tip of the bow). As yet another example, process 400 can determine a width of the vessel based on a distance (e.g., along a port-starboard direction) between an edge on a port-side and an edge on a starboard-side. In such an example, process 400 can identify points that are relatively closely aligned along a fore-aft direction (e.g., based on an axial position of the points with respect to the vessel).

At 414, process 400 can compare one or more stored dimensions (e.g., dimensions received at 402) to one or more corresponding measured dimensions (e.g., determined at 412). For example, process 400 can compare a stored length dimension (e.g., a length dimension L in memory) to a length dimension determined at 412. As another example, process 400 can compare a stored width dimension (e.g., a width dimension W in memory, or a width at a particular location, such as $W_1$ or $W_2$) to a corresponding width dimension determined at 412. In some embodiments, process 400 can determine a difference between the stored dimension and the corresponding measured dimension.

At 416, process 400 can determine whether a difference between the two measurements is within a tolerance. In some embodiments, the tolerance can be based on any suitable value or values. For example, the tolerance can be based on an accuracy metric (e.g., a depth accuracy) of the depth sensors that generated the data used to determine the location of the points used to measure the dimension(s). In such an example, the tolerance can be a sum of the depth accuracy of a depth sensor used to capture data from one end of the dimension (e.g., a tip of the bow, a port-side point, etc.) and a depth sensor used to capture data from the other end of the dimension. As described above, depth accuracy of a depth sensor can vary based on a distance from the depth sensor to the point being measured. Accordingly, in some embodiments, a tolerance can be a sum of a depth-based accuracy of the depth sensors used to generate the point cloud datapoints used to estimate the dimension.

If process 400 determines that each of the differences is within the tolerance ("YES" at 416), process 400 can return to 406, and can continue to receive labeled point cloud data periodically (e.g., at regular and/or irregular intervals), which can be used to determine whether a calibration of the vision system has degraded (e.g., due to a change in posture of a depth sensor, a change in properties of the depth sensor due to heat or temperature changes, etc.). For example, process 400 can estimate measurements of the vessel relatively infrequently (e.g., once per hour, once per day, etc.) during times at which depth data (e.g., point cloud data) is being generated (e.g., for another purpose, such as autonomous navigation). In some embodiments, if process 400 determines that each of the differences is within the tolerance, process 400 can replace and/or supplement dimensions provided at 402 with a dimension(s) measured at 412.

In some embodiments, in lieu of returning to 406, process 400 can end if the measured dimensions are the same (e.g., within predetermined tolerances) as the provided dimensions.

Otherwise, if process 400 determines that one or more of the differences is not within the tolerance ("NO" at 416), process 400 can move to 418.

At 418, process 400 can generate an alert and/or cause a prompt to be presented to a user indicating that there is an inconsistency between measured dimensions determined by the vision system of the vessel and provided dimensions. In some embodiments, process 400 can use any suitable technique or combination of techniques to generate an alert indicating that there is an inconsistency between measured dimensions determined by the vision system of the vessel and provided dimensions, such an alert can be in any suitable format, and/or such an alert can be provided to any suitable controller and/or location in memory. For example, the alert generated at 418 can be formatted as a message (e.g., from sensor processor 70 to central controller 24) that indicates that the provided and measured dimensions of the vessel are inconsistent, and/or an indication that one or more autonomous navigation features are to be disabled. Such a message can be an asynchronous message, or can be included in a synchronous transmission. As another example, the alert can be formatted as a flag in a message that is sent periodically (e.g., at regular and/or irregular intervals). In a more particular example, such a flag can be set to a first value if the dimensions are consistent, and can be set to a second value if the dimensions are not consistent. In some embodiments, an alert generated at 418 can include information indicating which dimension(s) are inconsistent, a magnitude of inconsistency in the measurements, a tolerance that was used, values of the measured dimension(s) and/or provided dimension(s), etc.

Additionally or alternatively, at 418, process 400 can cause a prompt to be presented to a user (e.g., via a user interface presented by a display of vessel 10, via a user interface of an application being executed by a computing device of a technician facilitating a calibration procedure, via a user interface of an application being executed by a mobile device paired with vessel 10, via a push notification to a mobile device, via email, via text message, etc.) indicating that there is inconsistency between provided dimensions and measured dimensions, that calibration of the visions system may not be accurate, and/or that use of some autonomous controls may not be safe. In some embodiments, the prompt can include, or otherwise be associated with, an indication that one or more autonomous navigation features have been disabled due to mismatch between measured and provided dimensions, and/or a need for recalibration of the visions system. In some embodiments, a prompt presented at 418 can include information indicating which dimension(s) are inconsistent, a magnitude of inconsistency in the measurements, a tolerance that was used, values of the measured dimension(s) and/or provided dimension(s), etc.

In some embodiments, subsequent to generating an alert and/or causing a prompt to be presented to a user at 418, process 400 can return to 402 and/or 406. For example, if a user (e.g., a technician facilitating a calibration procedure) is sure that provided measurements are correct, the technician may determine that the calibration procedure was not completed successfully, leading to data from one or more depth sensors having an incorrect position in the global coordinate system. After recalibration, process 400 can return to 406 and begin generating new measurements of the vessel's dimensions.

As another example, if the entered dimensions may be incorrect, a user (e.g., a technician facilitating a calibration procedure) can measure one or more dimensions that were inconsistent, and determine whether the provided dimension is consistent with that dimension as measured by the user. If the measurement is inconsistent, the user can adjust the provided dimension (e.g., via a user interface presented by a display of vessel 10, via a user interface of an application being executed by a computing device of a technician facilitating a calibration procedure, via a user interface of an application being executed by a mobile device paired with vessel 10, via a response to an email that included the alert and/or prompt, via a response to a text message that included the alert and/or prompt, etc.). The adjusted dimensions can be received at 402, and process 400 can return to 406 to begin generating new measurements of the vessels dimensions or can return to 414 to compare the newly provided dimensions to the previously measured dimensions.

Additionally, in some embodiments, at 418, process 400 can disable one or more autonomous navigation features and/or autonomous controls. For example, if process 400 determines that the vision system calibration has significantly degraded (e.g., "NO" at 416), process 400 can disable autonomous navigation features and/or autonomous controls, such as automatic docking. In such an example, process 400 can leave some autonomous features, such as certain autonomous safety features, enabled.

Additionally, in some embodiments, at 418, process 400 can take any other suitable action(s) based on inconsistency in measurements. For example, process 400 can provide (e.g., at 418) a history of past measurements of one or more dimensions, including a most-recent (e.g., inconsistent) measurement. Such measurements can include any suitable information, such as the measurement itself, the sensor(s) that was used to determine the measurement, a time at which the measurement was determined/recorded, etc. In such an example, providing a history of measurements can facilitate a technician (or other user) determining a time of failure (e.g., when the dimensions became inconsistent) and/or can facilitate identifying a sensor(s) that is likely responsible for the inconsistency.

As another example, process 400 can provide (e.g., at 418) identifying information associated with a file, firmware version, etc., used to determine the stored dimension(s) of the vessel. In such an example, such information can be a calibration file provided to a controller of the vessel (e.g., to be used for autonomous calibration, and/or other tasks that include using information about the vessel). Providing identifying information can facilitate a technician or other user determining whether the correct information was provided to the vessel (e.g., during manufacturing, during calibration, etc.), as if incorrect configuration information was provided for the dimensions the information may also include other parameters that are incorrect.

As yet another example, process 400 can cause (e.g., at 418) an indication to be presented with video and/or model data based on data from a sensor device(s) that may have caused the inconsistency. In such an example, process 400 can cause a warning to be provided when such data is presented (e.g., using a multi-function display (MFD) of the vessel) indicating that the data may not be accurate.

Figure 5:
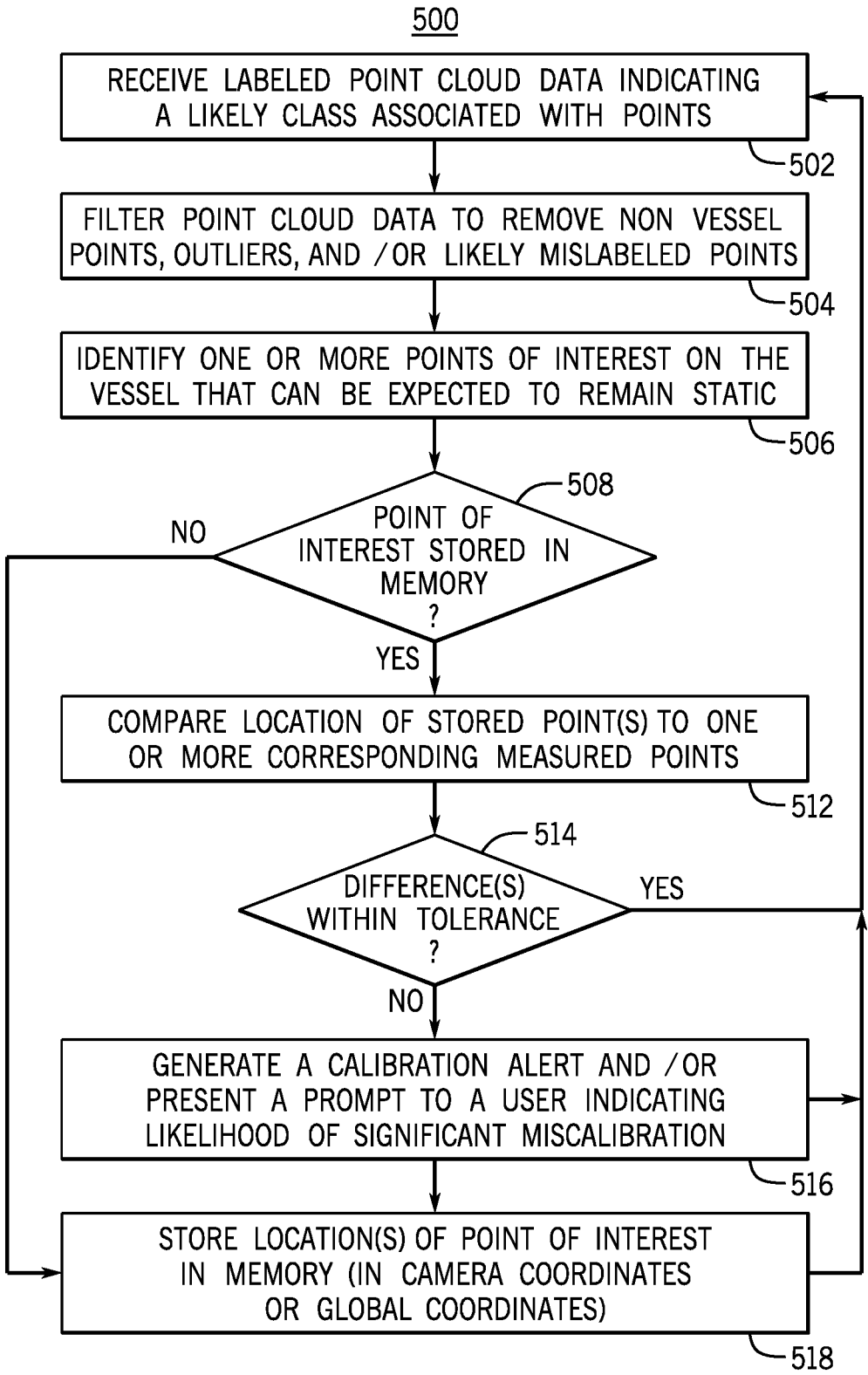
FIG. 5 shows an example of a process for monitoring calibration of a vision system on a marine vessel in accordance with some embodiments of the disclosure.

FIG. 5 shows an example of a process for monitoring calibration of a vision system on a marine vessel in accordance with some embodiments of the disclosure.

At 502, process 500 can generate and/or receive point cloud data that includes information indicative of a likely class associated with points of the point cloud data. In some embodiments, the point cloud points can be labeled point cloud points generated via another process. As described above in connection with 406 of FIG. 4, the point cloud data can be based on images captured to perform machine vision processes (e.g., to facilitate autonomous control and/or advanced operator assistance control). Additionally, as described above in connection with 406 of FIG. 4, the point cloud data can be labeled based on information generated by a trained machine learning model.

At 504, process 500 can filter point cloud data to remove points that do not correspond to the vessel, that are outliers, and/or that are likely to be mislabeled, using any suitable technique or combination of techniques, such as techniques described above in connection with 408 of FIG. 4.

At 506, process 500 can identify one or more points of interest on the vessel that can be expected to remain static over time using any suitable technique or combination of techniques. For example, process 500 can identify particular points on the vessel, such as a tip of the bow, a corner of the stern, a pillar that supports a hard top, etc., as a point of interest. In such an example, process 500 can use predetermined rules to identify the points of interest (e.g., which may be relatively simple rules), such as a forward-most point labeled as part of the vessel after filtering at 504, an aft-most point labeled as part of the vessel after filtering at 504, etc. Process 500 can correlate the identified point(s) of interest to a 3D location (e.g., based on depth data from the depth sensor, based on point cloud data), can identify a 3D location of the selected point, and/or an image pixel associated with the point.

As another example, process 500 can prompt a user to identify a point(s) of interest (e.g., via a user interface presented by a display of vessel 10, via a user interface of an application being executed by a computing device of a technician facilitating a calibration procedure, via a user interface of an application being executed by a mobile device paired with vessel 10, etc.) that are likely to remain static over time (e.g., a point on the hull). In such an example, process 500 can present an image (e.g., captured by a camera of a depth sensor), and a user can indicate a portion of the image that is likely to remain state (e.g., by touching a point on a touch screen, by selecting a point with a mouse, etc.). Process 500 can correlate the selected point(s) to a 3D location (e.g., based on depth data from the depth sensor, based on point cloud data), can identify a 3D location of the selected point, and/or an image pixel associated with the point.

As yet another example, process 500 can use automated point of interest detection techniques to identify points of interest in data corresponding to the vessel (e.g., based on classification data, based on a mask used to identify pixels corresponding to portions of the vessel, etc.). For example, process 500 can use a corner finding, edge finding, and/or blob detection technique to identify potential points of interest from 2D image data, a depth map, and/or point cloud data associated with the candidate feature. In a more particular example, process 500 can identify points of interest from 2D image data using techniques such as: the Harris corner detector; Scale Invariant Feature Transform (SIFT); Speeded Up Robust Feature (SURF); Features from Accelerated Segment Test (FAST); Oriented FAST and Rotated BRIEF (ORB).

As still another example, process 500 can use a previously recorded image pixel location(s) (e.g., based on a pixel corresponding to a stored point of interest) to identify a point(s) of interest. Process 500 can utilize depth data from a point corresponding to the same portion of the image as a point of interest.

In some embodiments process 500 can record a 3D location of each point of interest in any suitable coordinate system, such as a camera coordinate system and/or a global coordinate system. Additionally, in some embodiments, process 500 can record a 2D location of a pixel that imaged each point of interest (e.g., in a 2D image coordinate system).

At 508, process 500 can determine whether a location for a corresponding point of interest is stored in memory using any suitable technique or combination of techniques. For example, in some embodiments, a first time that process 500 is executed (e.g., for each depth sensor that includes at least a portion of vessel 10 within its FOV), process 500 can store one or more points of interest for each depth sensor (e.g., with a 3D location of the point, a 2D location of the point in an image coordinate system, and/or any other suitable information), as described below in connection with 510. At 508, process 500 can determine whether any points are stored in memory for a particular depth sensor.

If process 500 determines that there are not any corresponding points of interest stored in memory ("NO" at 508), process 500 can move to 510. At 510, process 500 can store information about one or more points of interest identified at 506 in memory (e.g., memory of a depth sensor device that captured the data, memory associated with sensor processor 70, memory associated with CCM 24, etc.).

Otherwise, if process 500 determines that there are one or more corresponding points of interest stored in memory ("YES" at 508), process 500 can move to 512.

At 512, process 500 can compare a location of the point(s) stored in memory to a location of one or more corresponding points measured at 506. For example, process 500 can determine a 3D distance (e.g., a Euclidean distance, a Manhattan distance, etc.) between the stored location and the measured location, and can determine a difference between the two locations for each pair of points. Note that if the points of interest are identified based on features of the data (e.g., corners, edges, forward-most points of the vessel, aft-most points of the vessel, etc.), the distance between the two points can represent a distance between the same point of the vessel as recorded at two different points in time. If the points of interest are identified based on location within an image coordinate system, the distance between the two points can represent a distance between the location of a point recorded by the corresponding location on the depth sensor (e.g., a pixel of an image sensor, a particular rotational position and detector of a lidar, etc.) at a first point in time, and a location of a point recorded by the corresponding location on the depth sensor at a second point in time, which may not correspond to the same point on the vessel if the depth sensor changed posture (or other characteristics) between the first time and second time.

At 514, process 500 can determine whether a difference between the stored location and a measured location of corresponding points is within a tolerance. In some embodiments, the tolerance can be based on any suitable value or values. For example, the tolerance can be based on an accuracy metric (e.g., a depth accuracy) of the depth sensor that generated the data used to determine the location of the points. In such an example, the tolerance can be the depth accuracy of the depth sensor at the depth of the point, or the average depth of the points (e.g., if the depth of the points are different). As described above, depth accuracy of a depth sensor can vary based on a distance from the depth sensor to the point being measured. Accordingly, in some embodiments, a tolerance can be based on a depth-based accuracy of the depth sensor used to generate the point cloud datapoint used to determine whether the point is located in approximately the same location.

If process 500 determines that the difference for each pair of points is within the tolerance ("YES" at 514), process 500 can return to 502, and can continue to receive labeled point cloud data periodically (e.g., at regular and/or irregular intervals), which can be used to determine whether a calibration of the vision system has degraded (e.g., due to a change in posture of a depth sensor, a change in properties of the depth sensor due to heat or temperature changes, etc.) over time. For example, process 500 can estimate locations of fixed points relatively infrequently (e.g., once per hour, once per day, etc.) during times at which depth data (e.g., point cloud data) is being generated (e.g., for another purpose, such as autonomous navigation).

Otherwise, if process 500 determines that at least one difference is not within the tolerance ("NO" at 514), process 500 can move to 516.

At 516, process 500 can generate a calibration alert and/or cause a prompt to be presented to a user indicating that calibration of the visions system may have significantly degraded (e.g., indicated by inconsistency between a location of a point measured by the vision system of the vessel at two different times). In some embodiments, process 500 can use any suitable technique or combination of techniques to generate a calibration alert, such an alert can be in any suitable format, and/or such an alert can be provided to any suitable controller and/or location in memory. For example, the calibration alert generated at 516 can be formatted as a message (e.g., from sensor processor 70 to central controller 24) that indicates that calibration of at least one depth sensor has likely significantly degraded, and/or an indication that one or more autonomous navigation features are to be disabled. Such a message can be an asynchronous message, or can be included in a synchronous transmission. As another example, the calibration alert can be formatted as a flag in a message that is sent periodically (e.g., at regular and/or irregular intervals). In a more particular example, such a flag can be set to a first value if the measurements of various fixed points are consistent, and can be set to a second value if the measurements of various fixed points are not consistent. In some embodiments, an alert generated at 516 can include information indicating which depth sensor(s) produced inconsistent locations for one or more fixed points, a magnitude of inconsistency in the measurements, a tolerance that was used, values of the measured locations, etc.

Additionally or alternatively, at 516, process 500 can cause a prompt to be presented to a user (e.g., via a user interface presented by a display of vessel 10, via a user interface of an application being executed by a computing device of a technician facilitating a calibration procedure, via a user interface of an application being executed by a mobile device paired with vessel 10, via a push notification to a mobile device, via email, via text message, etc.) indicating that calibration of the visions system may have significantly degraded (e.g., indicated by inconsistency between a location of a point measured by the vision system of the vessel at two different times), and/or that use of some autonomous controls may not be safe. In some embodiments, the prompt can include, or otherwise be associated with, an indication that one or more autonomous navigation features have been disabled due to a need for recalibration of the visions system. In some embodiments, a prompt presented at 516 can include information indicating which depth sensor(s) produced inconsistent locations for one or more fixed points, a magnitude of inconsistency in the measurements, a tolerance that was used, values of the measured locations, etc.

In some embodiments, subsequent to generating an alert and/or causing a prompt to be presented to a user at 516, process 500 can return to 502. For example, to continue monitoring calibration of the depth sensors. Additionally, in some embodiments, after recalibration, process 500 can return to 502 and can execute process 500 for a first time (e.g., overwriting, ignoring, or deleting one or more previously saved points of interest), and can begin generating new point of interest locations of the vessel.

Additionally, in some embodiments, at 518, process 500 can disable one or more autonomous navigation features and/or autonomous controls. For example, if process 500 determines that the vision system calibration has significantly degraded (e.g., "NO" at 514), process 500 can disable autonomous navigation features and/or autonomous controls, such as automatic docking. In such an example, process 500 can leave some autonomous features, such as certain autonomous safety features, enabled.

Figure 6:
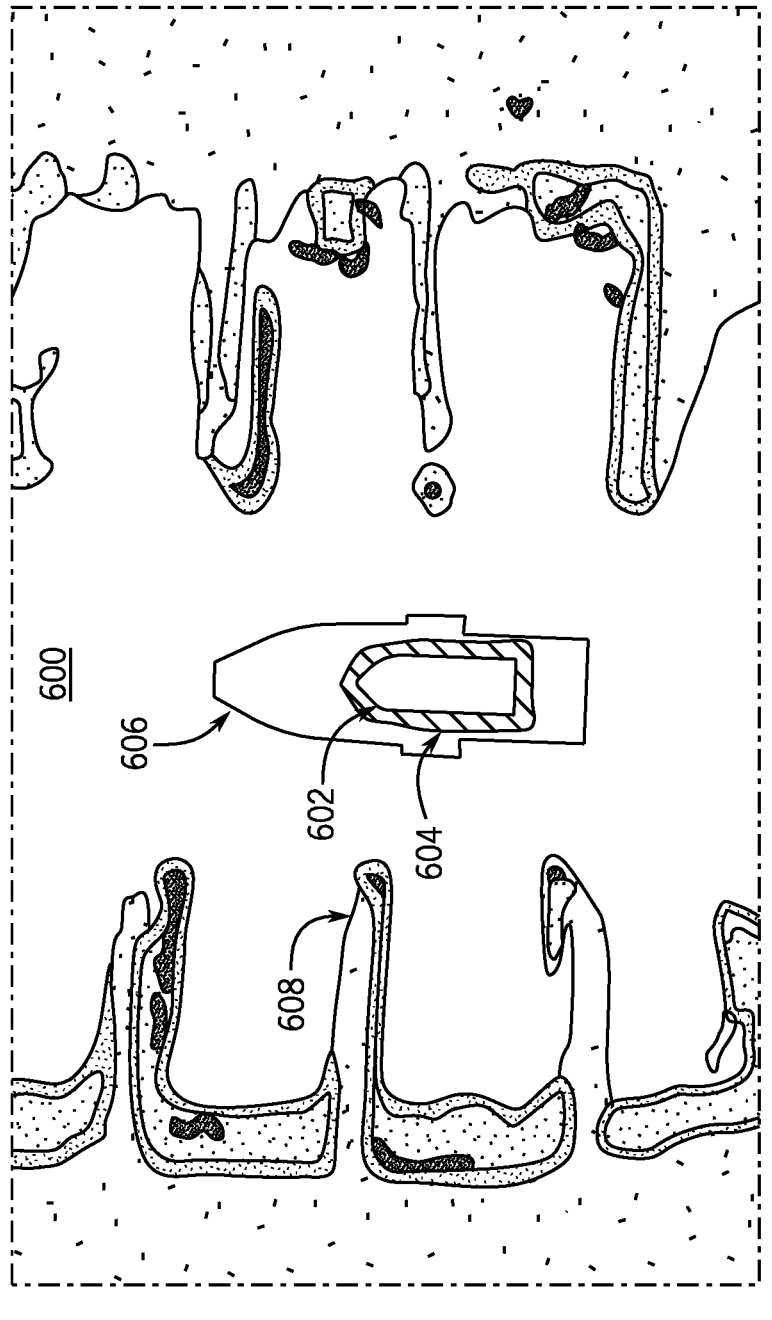
FIG. 6 shows an example of a model of a marine vessel and a portion of an environment around the vessel that can be generated at least in part based on dimensions of the vessel and used in autonomous navigation.

FIG. 6 shows an example of a model 600 of a marine vessel and a portion of an environment around the vessel that can be generated at least in part based on dimensions of the vessel and used in autonomous navigation. As shown in FIG. 6, in some embodiments, automatic control processes (e.g., autonomous navigation processes) can utilize model 600 of the environment (e.g., based on a labeled occupancy grid). A model 602 of vessel 10 can be used to plan a path, determine whether the vessel is likely to collide with any obstructions, etc. Additionally, a buffer 604 (e.g., a predetermined distance from vessel 10) and a projected depth sensor blind spot 606 can also be used for autonomous control. A size of model 602, buffer 604, and/or blind spot 606 can be based on the provided dimensions of vessel 10 (e.g., provided during a calibration procedure, as part of software installed on a controller of vessel 10, etc.). If the dimensions are incorrect, it can increase a likelihood that vessel 10 will collide with an object, or navigate erroneously (e.g., not approaching a dock closely in an autonomous docking maneuver due to an erroneously large dimension).

Figure 7:
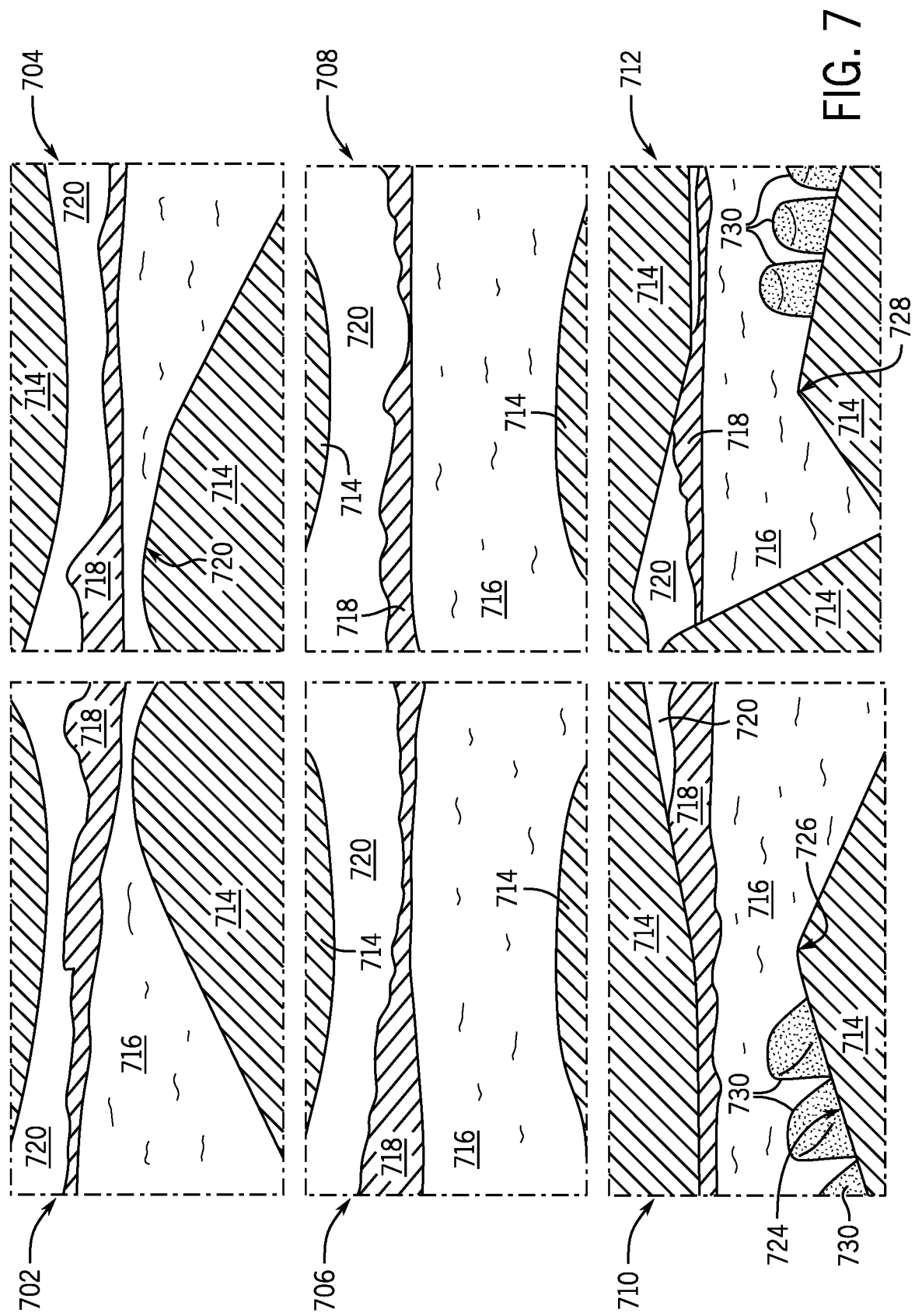
FIG. 7 shows examples of images captured by depth sensors mounted on a marine vessel, and portions of the images labeled as being part of the marine vessel.

FIG. 7 shows examples of images captured by depth sensors mounted on a marine vessel, and portions of the images labeled as being part of the marine vessel. In FIG. 7, various images 702, 704, 706, 708, 710, and 712 captured by depth sensors mounted on a vessel are shown with portions of the images depicted in different styles (e.g., colors, etc.) based on a class of the feature(s) in that portion of the image.

As shown in FIG. 7, portions of an image corresponding to the ego vessel can be labeled as an ego vessel class 714, and portions of the environment can be labeled (e.g., water can be classified with a water class 716, land and land-based vegetation can be classified with a land or other suitable class 718, sky can be labeled with a sky class 720, etc.). In some embodiments, differences between classes can be depicted in images 702-712 using any suitable technique. For example, portions labeled as ego vessel class 714 can be depicted in a first color (e.g., green), portions labeled as a water class 716 can be depicted in grayscale (e.g., based on detected brightness of those areas), portions labeled as a land class 718 can be depicted in another color (e.g., purple or shades of purple based on the grayscale brightness of those portions), and portions labeled as a sky class 720 can be depicted in yet another color (e.g., blue or shades of blue based on detected brightness of those areas). As described above, in some embodiments, information identifying a class associated with different portions of a scene can be used to identify points corresponding to different portions of a vessel, and determining dimensions of the vessel. For example, as described above in connection with 406, labeled image information (e.g., as shown in images 702-712) can be used to label point cloud points (or other depth information) with class information, and points corresponding to the ego vessel class 714 can be used to determine one or more dimensions of the vessel. For example, a forward-most point 722 and an aft-most point 728 labeled with ego vessel class 714 can be used to determine a length of the vessel, and a port corner 726 and starboard corner 728 labeled with ego vessel class 714 can be used to identify a width at the stern (which may or may not correspond to a beam of the vessel). Note that, in some examples, the length of the vessel that can be observed by sensors (e.g., sensors 72-78) may not correspond to a total length of the vessel (e.g., including portions not within a camera FOV, such as a swim platform). In such an example, the provided dimension can be based on a portion of the vessel that is within a camera FOV. A corresponding measurement can be determined (e.g., based on a CAD model of the vessel) or provided by a user. In some embodiments, certain components of the vessel that are not a part of the hull can be labeled as a class associated with that type of component, and/or can be labeled as a class associated with the ego vessel indicating that the components are not hull. For example, as shown in FIG. 7, outboard motors visible in images 710 and 712 can be labeled with class 730, which can correspond to motors, non-hull components of the ego vessel, etc.

Further Examples Having a Variety of Features

Implementation examples are described in the following numbered clauses:

1. A method for confirming dimensions of a marine vessel using a vision method on the marine vessel, the method comprising: determining a measured value of a dimension of the marine vessel based on a distance between a first point and a second point located using data from a plurality of cameras, including a first camera and a second camera, wherein each of the plurality of cameras is configured to be mounted to the marine vessel with an associated field of view of an environment of the marine vessel; determining whether a difference between the measured value of the dimension of the marine vessel and a provided value of the dimension exceeds a threshold; and in response to determining that the difference between the measured value of the dimension of the marine vessel and the provided value of the dimension exceeds the threshold, generating an alert.

2. The method of clause 1, wherein each of the plurality of cameras is associated with a three-dimensional camera coordinate system, and receiving three-dimensional location information associated with each of a first plurality of points on the marine vessel in a three-dimensional global coordinate system, wherein the three-dimensional location information associated with each of the first plurality of points is based on calibration information indicative of a transform between a first camera coordinate system associated with a first camera and the global coordinate system, and wherein the first camera is configured to be mounted to the marine vessel with an associated field of view including at least a first portion of the marine vessel; receiving three-dimensional location information associated with each of a second plurality of points on the marine vessel in the three-dimensional global coordinate system, wherein the three-dimensional location information associated with each of the second plurality of points is based on calibration information indicative of a transform between a second camera coordinate system associated with a second camera and the global coordinate system, wherein the second camera is configured to be mounted to the marine vessel with an associated field of view including at least a second portion of the marine vessel; identifying, based on the first plurality of points, a location of a first point corresponding to the first portion of the marine vessel; and identifying, based on the second plurality of points, a location of a second point corresponding to the second portion of the marine vessel.

3. The method of clause 2, wherein the dimension is a length of the marine vessel, the first portion of the marine vessel is a bow of the marine vessel, the first point is a tip of the bow in the first plurality of points, the second portion of the marine vessel is a stern of the marine vessel, and the second point is an aft-most point of the stern in the second plurality of points.

4. The method of clauses 2, further comprising: receiving three-dimensional location information associated with each of a third plurality of points on the marine vessel in a three-dimensional global coordinate system, wherein the three-dimensional location information associated with each of the third plurality of points is based on calibration information indicative of a transform between a third camera coordinate method associated with a third camera and the global coordinate system; receiving three-dimensional location information associated with each of a fourth plurality of points on the marine vessel in the three-dimensional global coordinate system, wherein the three-dimensional location information associated with each of the second plurality of points is based on calibration information indicative of a transform between a second camera coordinate method associated with the second camera and the global coordinate system; identifying, based on the third plurality of points, a location of a third point corresponding to a third portion of the marine vessel; identifying, based on the fourth plurality of points, a location of a fourth point corresponding to a fourth portion of the marine vessel; determine a measured value of a second dimension of the marine vessel based on a distance between the third point and the fourth point; determining that a difference between the measured value of the second dimension of the marine vessel and a provided value of the second dimension exceeds a second threshold; and in response to determining that the difference between the measured value of the second dimension of the marine vessel and the provided value of the second dimension exceeds the second threshold, generating the alert.

5. The method of clause 2, further comprising: receiving classification information associated with the first plurality of points, wherein the classification information includes an indication of a predicted class of a plurality of classes of each point in the first plurality of points, and wherein the plurality of classes includes: at least one ego vessel class indicating that the point is predicted to correspond to a point on the marine vessel; determining, based on the classification information, that the first point is predicted to be a point on the marine vessel; and determining that the first point is located farthest forward of points predicted to be a point on the marine vessel.

6. The method of clause 5, wherein the first plurality of points are points predicted to be a point on the marine vessel, and further comprising: filtering any points in the first plurality of points that are located more than a predetermined distance from a point predicted to be a point on the marine vessel, thereby generating a first subset of points; and determining that the first point is located farthest forward of points predicted to be a point on the marine vessel among the first subset of points.

7. The method of clause 2, wherein the three-dimensional location information associated with each of a first plurality of points comprises point cloud data.

8. The method of any one of clauses 1 to 7, further comprising: receiving, from memory, dimensions associated with the marine vessel, including the provided value of the dimensions.

9. The method of any one of clauses 1 to 7, further comprising: receiving three-dimensional location information associated with each of a fifth plurality of points on the marine vessel in a three-dimensional global coordinate system, wherein the three-dimensional location information associated with each of the fifth plurality of points is based on calibration information indicative of a transform between the first camera coordinate method associated with the first camera and the global coordinate system; receiving three-dimensional location information associated with each of a sixth plurality of points on the marine vessel in the three-dimensional global coordinate system, wherein the three-dimensional location information associated with each of the sixth plurality of points is based on calibration information indicative of a transform between the second camera coordinate method associated with the second camera and the global coordinate system; identifying, based on the fifth plurality of points, a location of a fifth point corresponding to the first portion of the marine vessel; identifying, based on the sixth plurality of points, a location of a sixth point corresponding to the second portion of the marine vessel; determining a second measured value of the dimension of the marine vessel based on a distance between the fifth point and the sixth point; determine whether a difference between the second measured value of the dimension of the marine vessel and the provided value of the dimension exceeds the threshold; and in response to determining that the difference between the measured value of the dimension of the marine vessel and the provided value of the dimension exceeds the threshold, generating a calibration alert.

9. The method of any one of clauses 1 to 8, wherein the dimension is a length of the marine vessel, the first portion of the marine vessel is a bow of the marine vessel, the first point is a tip of the bow in the first plurality of points, the second portion of the marine vessel is a stern of the marine vessel, and the second point is an aft-most point of the stern in the second plurality of points.

10. The method of clause 9, wherein the dimension is a width of the marine vessel, the third portion of the marine vessel is a port side of the marine vessel, the third point is a point along the port side of the marine vessel, the fourth portion of the marine vessel is a starboard side of the marine vessel, and the fourth point is a point along the starboard side of the marine vessel.

11. The method of any one of clauses 1 to 11, wherein the threshold is based on a first accuracy metric associated with the first camera and a second accuracy metric associated with the second camera.

12. The method of clause 11, wherein the first accuracy metric is based on a distance from the first camera to the first point, the second accuracy metric is based on a distance from the second camera to the second point, and the threshold is based on a sum of the first accuracy metric and the second accuracy metric.

13. The method of any one of clauses 1 to 12, wherein the alert indicates that the measured value of the dimension is inconsistent with the provided value of the dimension.

14. The method of any one of clauses 1 to 13, further comprising: causing a prompt to be presented to a user based on the alert.

15. A method for monitoring calibration of a vision method on a marine vessel, the method comprising: a plurality of cameras, including at least a first camera, wherein each of the plurality of cameras is configured to be mounted to the marine vessel with an associated field of view of an environment of the marine vessel, and wherein each of the plurality of cameras is associated with a three-dimensional camera coordinate method; one or more hardware processors configured to: receive three-dimensional location information associated with each of a first plurality of points on the marine vessel in a three-dimensional global coordinate system, wherein the three-dimensional location information associated with each of the first plurality of points is based on calibration information indicative of a transform between a first camera coordinate method associated with the first camera and the global coordinate system; identify, based on the first plurality of points, a location of a first point corresponding to a first portion of the marine vessel; store the location of the first point in memory; receive three-dimensional location information associated with each of a second plurality of points on the marine vessel in a three-dimensional global coordinate system, wherein the three-dimensional location information associated with each of the second plurality of points is based on calibration information indicative of a transform between the first camera coordinate method associated with the first camera and the global coordinate system; identify, based on the second plurality of points, a location of a second point corresponding to the first portion of the marine vessel; determine a distance between the location of the first point and the location of the second point determine whether the distance exceeds a threshold; and in response to determining that the distance exceeds the threshold, generate an alert.

16. The method of clause 15, wherein the threshold is based on a first accuracy metric associated with the first camera and a distance from the first camera to the first point.

17. The method of any one of clauses 15 or 16, further comprising: identifying the first point in the first plurality of points as a first point of interest; identifying the second point in the second plurality of points as a second point of interest; and determining that the second point corresponds to a same portion of the marine vessel based on one or more characteristics of the first point of interest and the second point of interest.

18. The method of any one of clauses 15 to 17, wherein the three-dimensional location information associated with each of a first plurality of points comprises point cloud data.

19. A system comprising: one or more processors configured to: perform a method of any of clauses 1 to 18.

20. The system of claim 19, further comprising: a plurality of cameras, including at least a first camera and a second camera, wherein each of the plurality of cameras is configured to be mounted to the marine vessel with an associated field of view of an environment of the marine vessel, and wherein each of the plurality of cameras is associated with a three-dimensional camera coordinate system.

21. A non-transitory computer-readable medium storing computer-executable code, comprising code for causing a computer to cause a processor to: perform a method of any of clauses 1 to 18.

In some embodiments, any suitable computer readable media can be used for storing instructions for performing functions and/or processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as RAM, Flash memory, electrically programmable read only memory (EPROM), electrically erasable programmable read only memory (EE-PROM), etc.), any suitable media that is not fleeting or devoid of any semblance of permanence during transmission, and/or any suitable tangible media. As another example, transitory computer readable media can include signals on networks, in wires, conductors, optical fibers, circuits, or any suitable media that is fleeting and devoid of any semblance of permanence during transmission, and/or any suitable intangible media.

It should be noted that, as used herein, the term mechanism can encompass hardware, software, firmware, or any suitable combination thereof.

It should be understood that above-described steps of the processes of FIGS. 4 and 5 can be executed or performed in any suitable order or sequence not limited to the order and sequence shown and described in the figures. Also, some of the above steps of the processes of FIGS. 4 and 5 can be executed or performed substantially simultaneously where appropriate or in parallel to reduce latency and processing times.

This written description uses examples to disclose the invention(s), including the best mode, and also to enable any person skilled in the art to make and use the invention(s). Certain terms have been used for brevity, clarity, and understanding. No unnecessary limitations are to be inferred therefrom beyond the requirement of the prior art because such terms are used for descriptive purposes only and are intended to be broadly construed. The patentable scope of the invention(s) is defined by the claims and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

What is claimed is:

1. A system for confirming dimensions of a marine vessel using a vision system on the marine vessel, the system comprising:

a plurality of cameras, including at least a first camera and a second camera, wherein each of the plurality of cameras is configured to be mounted to the marine vessel with an associated field of view of an environment of the marine vessel;

one or more hardware processors configured to:

determine a measured value of a dimension of the marine vessel based on a distance between a first point and a second point located using data from the plurality of cameras;

determine whether a difference between the measured value of the dimension of the marine vessel and a provided value of the dimension exceeds a threshold; and in response to determining that the difference between the measured value of the dimension of the marine vessel and the provided value of the dimension exceeds the threshold, generate an alert.

2. The system of claim 1, wherein each of the plurality of cameras is associated with a three-dimensional camera coordinate system, and wherein the one or more hardware processors are further configured to:

receive three-dimensional location information associated with each of a first plurality of points on the marine vessel in a three-dimensional global coordinate system, wherein the three-dimensional location information associated with each of the first plurality of points is based on calibration information indicative of a transform between a first camera coordinate system associated with the first camera and the global coordinate system;

receive three-dimensional location information associated with each of a second plurality of points on the marine vessel in the three-dimensional global coordinate system, wherein the three-dimensional location information associated with each of the second plurality of points is based on calibration information indicative of a transform between a second camera coordinate system associated with the second camera and the global coordinate system;

identify, based on the first plurality of points, a location of a first point corresponding to a first portion of the marine vessel; and identify, based on the second plurality of points, a location of a second point corresponding to a second portion of the marine vessel.

3. The system of claim 2, wherein the dimension is a length of the marine vessel, the first portion of the marine vessel is a bow of the marine vessel, the first point is a tip of the bow in the first plurality of points, the second portion of the marine vessel is a stern of the marine vessel, and the second point is an aft-most point of the stern in the second plurality of points.

4. The system of claim 2, wherein the one or more hardware processors are further configured to:

receive three-dimensional location information associated with each of a fifth plurality of points on the marine vessel in a three-dimensional global coordinate system, wherein the three-dimensional location information associated with each of the fifth plurality of points is based on calibration information indicative of a transform between the first camera coordinate system associated with the first camera and the global coordinate system;

receive three-dimensional location information associated with each of a sixth plurality of points on the marine vessel in the three-dimensional global coordinate system, wherein the three-dimensional location information associated with each of the sixth plurality of points is based on calibration information indicative of a transform between the second camera coordinate system associated with the second camera and the global coordinate system;

identify, based on the fifth plurality of points, a location of a fifth point corresponding to the first portion of the marine vessel;

identify, based on the sixth plurality of points, a location of a sixth point corresponding to the second portion of the marine vessel;

determine a second measured value of the dimension of the marine vessel based on a distance between the fifth point and the sixth point;

determine whether a difference between the second measured value of the dimension of the marine vessel and the provided value of the dimension exceeds the threshold; and in response to determining that the difference between the measured value of the dimension of the marine vessel and the provided value of the dimension exceeds the threshold, generate a calibration alert.

5. The system of claim 2, wherein the one or more hardware processors are further configured to:

receive classification information associated with the first plurality of points, wherein the classification information includes an indication of a predicted class of a plurality of classes of each point in the first plurality of points, and wherein the plurality of classes includes:

at least one ego vessel class indicating that the point is predicted to correspond to a point on the marine vessel;

determine, based on the classification information, that the first point is predicted to be a point on the marine vessel; and determine that the first point is located farthest forward of points predicted to be a point on the marine vessel.

6. The system of claim 5, wherein the first plurality of points are points predicted to be a point on the marine vessel, and wherein the one or more hardware processors are further configured to:

filter any points in the first plurality of points that are located more than a predetermined distance from a point predicted to be a point on the marine vessel, thereby generating a first subset of points; and determine that the first point is located farthest forward of points predicted to be a point on the marine vessel among the first subset of points.

7. The system of claim 2, wherein the three-dimensional location information associated with each of a first plurality of points comprises point cloud data.

8. The system of claim 1, wherein the one or more hardware processors are further configured to:

receive, from memory, dimensions associated with the marine vessel, including the provided value of the dimensions.

9. The system of claim 1, wherein the one or more hardware processors are further configured to:

receive three-dimensional location information associated with each of a third plurality of points on the marine vessel in a three-dimensional global coordinate system, wherein the three-dimensional location information associated with each of the third plurality of points is based on calibration information indicative of a transform between a third camera coordinate system associated with a third camera and the global coordinate system;

receive three-dimensional location information associated with each of a fourth plurality of points on the marine vessel in the three-dimensional global coordinate system, wherein the three-dimensional location information associated with each of the second plurality of points is based on calibration information indicative of a transform between a second camera coordinate system associated with the second camera and the global coordinate system;

identify, based on the third plurality of points, a location of a third point corresponding to a third portion of the marine vessel;

identify, based on the fourth plurality of points, a location of a fourth point corresponding to a fourth portion of the marine vessel;

determine a measured value of a second dimension of the marine vessel based on a distance between the third point and the fourth point;

determine that a difference between the measured value of the second dimension of the marine vessel and a provided value of the second dimension exceeds a second threshold; and in response to determining that the difference between the measured value of the second dimension of the marine vessel and the provided value of the second dimension exceeds the second threshold, generate the alert.

10. The system of claim 9, wherein the dimension is a width of the marine vessel, the third portion of the marine vessel is a port side of the marine vessel, the third point is a point along the port side of the marine vessel, the fourth portion of the marine vessel is a starboard side of the marine vessel, and the fourth point is a point along the starboard side of the marine vessel.

11. The system of claim 1, wherein the threshold is based on a first depth accuracy metric associated with the first camera and a second depth accuracy metric associated with the second camera.

12. The system of claim 1, wherein the threshold is based on a first accuracy metric associated with the first camera and a second accuracy metric associated with the second camera, and wherein the first accuracy metric is based on a distance from the first camera to the first point, the second accuracy metric is based on a distance from the second camera to the second point, and the threshold is based on a sum of the first accuracy metric and the second accuracy metric.

13. The system of claim 1, wherein the alert indicates that the measured value of the dimension is inconsistent with the provided value of the dimension.

14. The system of claim 1, wherein the one or more hardware processors are further configured to:

cause a prompt to be presented to a user based on the alert.

15. A method for confirming dimensions of a marine vessel using a vision system on the marine vessel, the method comprising:

determining a measured value of a dimension of the marine vessel based on a distance between a first point and a second point located using data from a plurality of cameras, including a first camera and a second camera, wherein each of the plurality of cameras is configured to be mounted to the marine vessel with an associated field of view of an environment of the marine vessel;

determining whether a difference between the measured value of the dimension of the marine vessel and a provided value of the dimension exceeds a threshold; and in response to determining that the difference between the measured value of the dimension of the marine vessel and the provided value of the dimension exceeds the threshold, generating an alert.

16. The method of claim 15, further comprising:

receiving three-dimensional location information associated with each of a first plurality of points on the marine vessel in a three-dimensional global coordinate system, wherein the three-dimensional location information associated with each of the first plurality of points is based on calibration information indicative of a transform between a first camera coordinate system associated with a first camera and the global coordinate system, and wherein the first camera is configured to be mounted to the marine vessel with an associated field of view including at least a first portion of the marine vessel;

receiving three-dimensional location information associated with each of a second plurality of points on the marine vessel in the three-dimensional global coordinate system, wherein the three-dimensional location information associated with each of the second plurality of points is based on calibration information indicative of a transform between a second camera coordinate system associated with a second camera and the global coordinate system, wherein the second camera is configured to be mounted to the marine vessel with an associated field of view including at least a second portion of the marine vessel;

identifying, based on the first plurality of points, a location of a first point corresponding to the first portion of the marine vessel; and identifying, based on the second plurality of points, a location of a second point corresponding to the second portion of the marine vessel.

17. The method of claim 15, further comprising receiving, from memory, dimensions associated with the vessel, including the provided value of the dimensions.

18. The method of claim 15, wherein the threshold is based on a first accuracy metric associated with the first camera and a second accuracy metric associated with the second camera.

19. The method of claim 18, wherein the first accuracy metric is based on a distance from the first camera to the first point, the second accuracy metric is based on a distance from the second camera to the second point, and the threshold is based on a sum of the first accuracy metric and the second accuracy metric.

20. The method of claim 16, further comprising:
receiving three-dimensional location information associated with each of a fifth plurality of points on the marine vessel in a three-dimensional global coordinate system,
wherein the three-dimensional location information associated with each of the fifth plurality of points is based on calibration information indicative of a transform between the first camera coordinate system associated with the first camera and the global coordinate system;
receiving three-dimensional location information associated with each of a sixth plurality of points on the marine vessel in the three-dimensional global coordinate system,
wherein the three-dimensional location information associated with each of the sixth plurality of points is based on calibration information indicative of a transform between the second camera coordinate system associated with the second camera and the global coordinate system;
identifying, based on the fifth plurality of points, a location of a fifth point corresponding to the first portion of the marine vessel;
identifying, based on the sixth plurality of points, a location of a sixth point corresponding to the second portion of the marine vessel;
determining a second measured value of the dimension of the marine vessel based on a distance between the fifth point and the sixth point;
determining whether a difference between the second measured value of the dimension of the marine vessel and the provided value of the dimension exceeds the threshold; and
in response to determining that the difference between the measured value of the dimension of the marine vessel and the provided value of the dimension exceeds the threshold, generating a calibration alert.

21. A system for monitoring calibration of a vision system on a marine vessel, the system comprising:
a plurality of cameras, including at least a first camera,
wherein each of the plurality of cameras is configured to be mounted to the marine vessel with an associated field of view of an environment of the marine vessel, and wherein each of the plurality of cameras is associated with a three-dimensional camera coordinate system;
one or more hardware processors configured to:
receive three-dimensional location information associated with each of a first plurality of points on the marine vessel in a three-dimensional global coordinate system,
wherein the three-dimensional location information associated with each of the first plurality of points is based on calibration information indicative of a transform between a first camera coordinate system associated with the first camera and the global coordinate system;
identify, based on the first plurality of points, a location of a first point corresponding to a first portion of the marine vessel;
store the location of the first point in memory;
receive three-dimensional location information associated with each of a second plurality of points on the marine vessel in a three-dimensional global coordinate system,
wherein the three-dimensional location information associated with each of the second plurality of points is based on calibration information indicative of a transform between the first camera coordinate system associated with the first camera and the global coordinate system;
identify, based on the second plurality of points, a location of a second point corresponding to the first portion of the marine vessel;
determine a distance between the location of the first point and the location of the second point
determine whether the distance exceeds a threshold,
wherein the threshold is based on a first accuracy metric associated with the first camera and a distance from the first camera to the first point; and
in response to determining that the distance exceeds the threshold, generate an alert.

22. The system of claim 21, wherein the one or more hardware processors are further configured to:
identify the first point in the first plurality of points as a first point of interest;
identify the second point in the second plurality of points as a second point of interest; and
determine that the second point corresponds to a same portion of the marine vessel based on one or more characteristics of the first point of interest and the second point of interest.

23. The system of claim 21, wherein the three-dimensional location information associated with each of a first plurality of points comprises point cloud data.

24. The system of claim 1, wherein the dimension is a length of the marine vessel, the first point is a tip of a bow of the marine vessel, and the second point is an aft-most point of a stern of the marine vessel.

* * * * *